(12) United States Patent
Pantelidou et al.

(10) Patent No.: US 12,408,057 B2
(45) Date of Patent: Sep. 2, 2025

(54) APPARATUS FOR RADIO ACCESS NETWORK DATA COLLECTION

(71) Applicant: Nokia Technologies Oy, Espoo (FI)

(72) Inventors: Anna Pantelidou, Massy (FR); Janne Ali-Tolppa, Pirkkala (FI); Cinzia Sartori, Pullach (DE); Malgorzata Tomala, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 593 days.

(21) Appl. No.: 17/636,343

(22) PCT Filed: Sep. 13, 2019

(86) PCT No.: PCT/EP2019/074510
§ 371 (c)(1),
(2) Date: Feb. 17, 2022

(87) PCT Pub. No.: WO2021/047781
PCT Pub. Date: Mar. 18, 2021

(65) Prior Publication Data
US 2022/0295324 A1    Sep. 15, 2022

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC .............................. H04W 24/10; H04W 24/08
See application file for complete search history.

(56) References Cited

U.S. PATENT DOCUMENTS

2007/0239399 A1* 10/2007 Sheynblat ............... G06F 9/547
702/187
2013/0109320 A1* 5/2013 Tomala .................. H04W 24/10
455/67.11

(Continued)

FOREIGN PATENT DOCUMENTS

EP        3457634 A1      3/2019
WO   2011/101026 A1 *   8/2011

(Continued)

OTHER PUBLICATIONS

Nokai Siemens Network:MDT Satge 2 For UTRAN:3GPP Draft Nov. 7, 2010 (Year: 2010).*

(Continued)

*Primary Examiner* — Abdullahi E Salad
(74) *Attorney, Agent, or Firm* — Carter, DeLuca & Farrell LLP

(57) ABSTRACT

There is provided an apparatus comprising means for: configuring a measurement collection for one or more pre-determined optimization problems at a first data producer; transmitting a first measurement request to the first data producer, wherein the first measurement request is indicative of requested measurement(s) for the one or more pre-determined optimization problems, time sampling indication and granularity; receiving a measurement response comprising first measurement results corresponding to the first measurement request; and providing the first measurement results to one or more optimization algorithms for solving the one or more pre-determined optimization problems.

8 Claims, 18 Drawing Sheets

(56) References Cited

U.S. PATENT DOCUMENTS

| | | | | |
|---|---|---|---|---|
| 2013/0155895 | A1* | 6/2013 | Kim | H04L 43/067 |
| | | | | 370/252 |
| 2014/0099940 | A1* | 4/2014 | Kim | H04W 24/10 |
| | | | | 455/422.1 |
| 2017/0026888 | A1* | 1/2017 | Kwan | H04W 36/304 |
| 2017/0303157 | A1* | 10/2017 | Siomina | H04W 4/06 |
| 2020/0236636 | A1* | 7/2020 | Liu | H04W 56/001 |
| 2020/0236718 | A1* | 7/2020 | Sundararajan | H04W 74/0833 |
| 2020/0389804 | A1* | 12/2020 | Sharma | H04J 3/0661 |

FOREIGN PATENT DOCUMENTS

| | | |
|---|---|---|
| WO | 2019/011441 A1 | 1/2019 |
| WO | 2020/244905 A1 | 12/2020 |

OTHER PUBLICATIONS

Notice of Allowance received for corresponding European Patent Application No. 19769448.2, dated Oct. 27, 2023, 8 pages.

Office action received for corresponding Chinese Patent Application No. 201980100271.5, dated Jan. 10, 2024, 8 pages of office action and no page of translation available.

Office action received for corresponding Indian Patent Application No. 202247021244, dated Aug. 30, 2022, 6 pages.

"3rd Generation Partnership Project; Technical Specification Group Radio Access Network; Evolved Universal Terrestrial Radio Access (E-UTRA) and NR; Study on RAN-centric data collection and utilization for LTE and NR (Release 16)", 3GPP TR 37.816, V1.0.0, Jun. 2019, pp. 1-35.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 3GPP TS 37.320, V15.0.0, Jun. 2018, pp. 1-27.

"Revised SID : Study on RAN-centric data collection and utilization for LTE and NR", 3GPP TSG RAN Meeting #81, RP-182105, Agenda: 9.3.13, CMCC, Sep. 10-13, 2018, 6 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.5.1, Apr. 2019, pp. 1-948.

Kojola et al., "Distributed Computing of Management Data in a Telecommunications Network", International Conference on Mobile Networks and Management, 2016, pp. 146-159.

International Search Report and Written Opinion received for corresponding Patent Cooperation Treaty Application No. PCT/EP2019/074510, dated Jun. 15, 2020, 14 pages.

"MDT stage 2 for UTRAN", 3GPP TSG-SA5 (Telecom Management), S5-103105, Agenda: 6.5.3, Nokia Siemens Networks, Nov. 15-19, 2010, 9 pages.

"New WID on SON/MDT support for NR", 3GPP TSG RAN Meeting #84, RP-191594, Agenda: 9.1.3, CMCC, Jun. 3-6, 2019, 5 pages.

Office action received for corresponding European Patent Application No. 19769448.2, dated Mar. 2, 2023, 5 pages.

* cited by examiner

APPARATUS FOR RADIO ACCESS NETWORK DATA COLLECTION

RELATED APPLICATION

This application claims priority to PCT Application No. PCT/EP2019/074510, filed on Sep. 13, 2019, which is incorporated herein by reference in its entirety.

FIELD

Various example embodiments relate to radio access network data collection, e.g. minimization of drive test data collection, and machine learning based optimization of networks.

BACKGROUND

Vast amount of data needs to be collected to enable the operators to monitor and optimize their network deployments. Massive set of data and metadata may be challenging to analyse and process. Thus, there is a need to improve the data collection.

SUMMARY

According to some aspects, there is provided the subject-matter of the independent claims. Some embodiments are defined in the dependent claims. The scope of protection sought for various embodiments is set out by the independent claims. The embodiments, examples and features, if any, described in this specification that do not fall under the scope of the independent claims are to be interpreted as examples useful for understanding various embodiments.

According to a first aspect, there is provided an apparatus comprising means for: configuring a measurement collection for one or more pre-determined optimization problems at a first data producer; transmitting a first measurement request to the first data producer, wherein the first measurement request is indicative of requested measurement(s) for the one or more pre-determined optimization problems, time sampling indication and granularity; receiving a measurement response comprising first measurement results corresponding to the first measurement request; and providing the first measurement results to one or more optimization algorithms for solving the one or more pre-determined optimization problems.

According to a second aspect, there is provided an apparatus comprising means for: receiving a configuration of a measurement collection for one or more pre-determined optimization problems; receiving a first measurement request indicative of requested measurement(s) for the one or more pre-determined optimization problems, time sampling indication and granularity; performing the requested measurement(s) according to the first measurement request and/or requesting the requested measurement(s) according to the first measurement request from one or more user equipments; and transmitting a measurement response comprising first measurement results corresponding to the first measurement request.

According to a third aspect, there is provided a method comprising configuring a measurement collection for one or more pre-determined optimization problems at a first data producer; transmitting a first measurement request to the first data producer, wherein the first measurement request is indicative of requested measurement(s) for the one or more pre-determined optimization problems, time sampling indication and granularity; receiving a measurement response comprising first measurement results corresponding to the first measurement request; and providing the first measurement results to one or more optimization algorithms for solving the one or more pre-determined optimization problems.

According to a fourth aspect, there is provided a method comprising: receiving a configuration of a measurement collection for one or more pre-determined optimization problems; receiving a first measurement request indicative of requested measurement(s) for the one or more pre-determined optimization problems, time sampling indication and granularity; performing the requested measurement(s) according to the first measurement request and/or requesting the requested measurement(s) according to the first measurement request from one or more user equipments; and transmitting a measurement response comprising first measurement results corresponding to the first measurement request.

According to further aspect, there is provided an optionally non-transitory computer readable medium comprising program instructions that, when executed by at least one processor, cause an apparatus at least to perform the method according to third aspect.

According to further aspect, there is provided an optionally non-transitory computer readable medium comprising program instructions that, when executed by at least one processor, cause an apparatus at least to perform the method according to fourth aspect.

According to further aspect, there is provided a computer program configured to cause a method according to third aspect to be performed.

According to further aspect, there is provided a computer program configured to cause a method according to fourth aspect to be performed.

DETAILED DESCRIPTION

Figure 1:
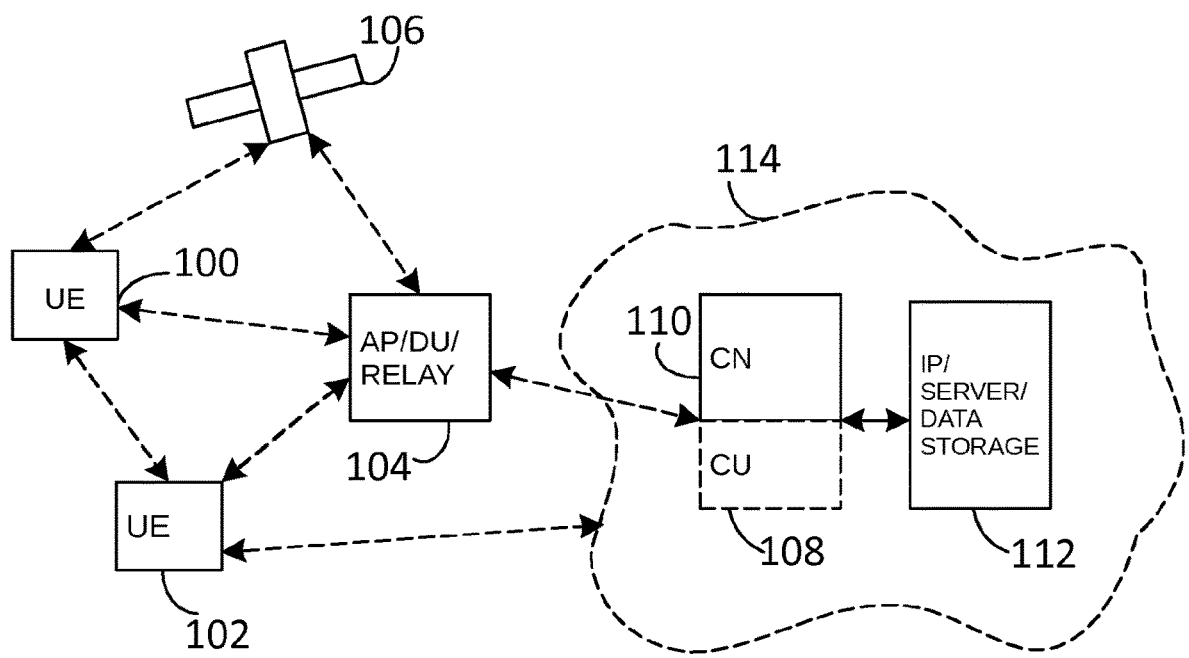
FIG. 1 shows, by way of example, a system architecture.

FIG. 1 shows, by way of an example, a system architecture. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1. The embodiments are not, however, restricted to the system given as an example but a person skilled in the art may apply the solution to other communication systems provided with necessary properties. Examples of such other communication systems include microwave links and optical fibers, for example.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB, 104 providing the cell, called NodeB for simplicity in the rest of this application. The physical link from a user device to the NodeB is called uplink or reverse link and the physical link from the NodeB to the user device is called downlink or forward link. It should be appreciated that NodeBs or their functionalities may be implemented by using any node, host, server or access point etc. entity suitable for such a usage. A communications system typically comprises more than one NodeB in which case the NodeBs may also be configured to communicate with one another over links, wired or wireless, designed for the purpose. These links may be used for signalling purposes.

The NodeB is a computing device configured to control the radio resources of the communication system it is coupled to. The NodeB may also be referred to as a base station, an access point or any other type of interfacing device including a relay station capable of operating in a wireless environment. The NodeB includes or is coupled to transceivers. From the transceivers of the NodeB, a connection is provided to an antenna unit that establishes bi-directional radio links to user devices. The antenna unit may comprise a plurality of antennas or antenna elements. The NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, also including a relay node. An example of such a relay node is a layer 3 relay (self-backhauling relay) towards a base station.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors, microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is distributed in the radio and centralized in the core network. The low latency applications and services in 5G require bringing the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements, such as Big Data and all-IP, may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of NodeBs, the user device may have an access to a plurality of radio cells and the system may comprise also other apparatuses, such as physical layer relay nodes or other network elements, etc. A cellular radio system may be implemented as a multilayer network including several kinds of cells, such as macrocells, microcells and picocells, for example. Typically, in multilayer networks, one access node provides one kind of a cell or cells, and thus a plurality of NodeBs are required to provide such a network structure.

Self-organizing network (SON) refers to the ability of the network to work in a self-organized manner. Next generation RAN features are expected to have e.g. the following capabilities: self-planning, self-configuration and self-optimization.

Drive Test is a kind of testing procedure that may be used when measuring various network performance, e.g. cell power and/or interference and/or user equipment (UE) performance, e.g. call drop, throughput, handover performance and/or cell reselection performance. There are various reasons why drive tests are performed. The operators need to identify areas where new base stations may be needed (capacity optimization). There is a need to identify weak coverage area, interference, overshooting etc. (coverage optimization). The mobile devices, or UEs, try to handover to different cells under certain circumstances. Thus, there is a need to minimize any kind of handover failures in a mobile network (mobility optimization). Quality of service (QoS) is related with delay, service response time, data rate and packet loss. QoS may be measured through key performance indicators (KPIs) and may be identified through the tests (QoS verification). Traditionally, a testing vehicle drives around a certain route to measure the performances. This requires, in addition to the testing vehicles, a lot of personnel and other resources to collect the measurement data and analyse the data.

Minimization of drive test (MDT) refers to mechanism(s) that aim to minimize the Drive Test and thus save the time and costs related to the Drive Test. In MDT, UEs are deployed to carry out the measurements. The UEs may store or log the measurement results and report them later to the network. Alternatively, the UEs may report the results in real-time.

MDT specified in 3GPP allows the collection of both UE and evolved or next generation network node (nodeB), e.g. e/gNB data measurements. There are two modes for the MDT measurements: Logged MDT and Immediate MDT. In Logged MDT, the data may be collected by the UE when in idle or inactive mode. The UE may report the measurement log to the network, e.g. to the e/gNB, at a later point in time. In Immediate MDT, the UE is in connected mode when performing the measurements and may report the measurements to the network immediately. In addition, the Immediate MDT may involve measurements by the network. Commercial UEs, when activated for MDT, may automatically collect the measurements and report them to the network. MDT measurement results may be put into MDT Trace Records and signalled onwards to operators' operations, administration and maintenance (OAM) entity for further post-processing.

Figure 2:
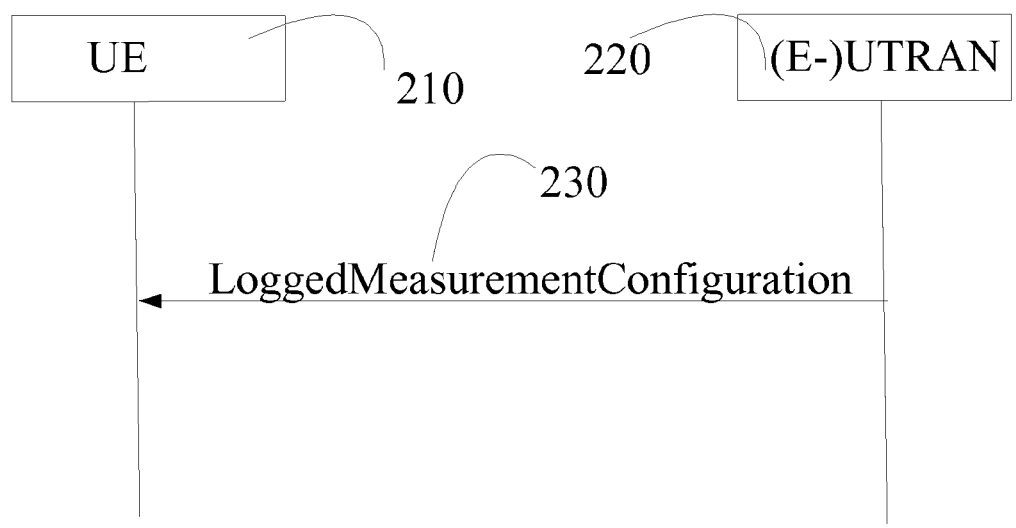
FIG. 2 shows, by way of example, minimization of drive test (MDT) measurement configuration for Logged MDT.

FIG. 2 shows, by way of example, MDT measurement configuration for Logged MDT. The network, e.g. (E-)UTRAN 220 in the example of FIG. 2, may configure a UE 210 with Logged MDT measurement configuration using a LoggedMeasurementConfiguration message 230. A logged measurement configuration at a UE is released if it is replaced by another Logged MDT configuration or in case configuration clearance occurs, e.g. a duration timer expires or an expiration condition is met. The logged measurement configuration may be given as follows, as defined e.g. in TS 36.331:

```
-- ASN1START
LoggedMeasurementConfiguration-r10 ::=         SEQUENCE {
            criticalExtensions                 CHOICE {
            c1                                 CHOICE {
            loggedMeasurementConfiguration-r10
            LoggedMeasurementConfiguration-r10-IEs,
            spare3 NULL, spare2 NULL, spare1 NULL
              },
                criticalExtensionsFuture       SEQUENCE { }
            }
}
LoggedMeasurementConfiguration-r10-IEs ::= SEQUENCE {
            traceReference-r10                 TraceReference-r10,
            traceRecordingSessionRef-r10       OCTET STRING (SIZE (2)),
            tce-Id-r10                         OCTET STRING (SIZE (1)),
            absoluteTimeInfo-r10               AbsoluteTimeInfo-r10,
            areaConfiguration-r10              AreaConfiguration-r10
            OPTIONAL, -- Need OR
            loggingDuration-r10                LoggingDuration-r10,
            loggingInterval-r10                LoggingInterval-r10,
            nonCriticalExtension               LoggedMeasurementConfiguration-
v1080-IEs   OPTIONAL
}
LoggedMeasurementConfiguration-v1080-IEs ::= SEQUENCE {
            lateNonCriticalExtension-r10       OCTET STRING
            OPTIONAL,
            nonCriticalExtension               LoggedMeasurementConfiguration-
v1130-IEs   OPTIONAL
}
LoggedMeasurementConfiguration-v1130-IEs ::= SEQUENCE {
            plmn-IdentityList-r11              PLMN-IdentityList3-r11
            OPTIONAL, -- Need OR
            areaConfiguration-v1130            AreaConfiguration-v1130
            OPTIONAL, -- Need OR
            nonCriticalExtension               LoggedMeasurementConfiguration-
v1250-IEs   OPTIONAL
}
LoggedMeasurementConfiguration-v1250-IEs ::= SEQUENCE {
            targetMBSFN-AreaList-r12           TargetMBSFN-AreaList-r12
            OPTIONAL, -- Need OP
            nonCriticalExtension               LoggedMeasurementConfiguration-
v1530-IEs                                      OPTIONAL
}
LoggedMeasurementConfiguration-v1530-IEs ::= SEQUENCE {
            bt-NameList-r15                    BT-NameList-r15
            OPTIONAL, --Need OR
            wlan-NameList-r15                  WLAN-NameList-r15
            OPTIONAL, --Need OR
            nonCriticalExtension               SEQUENCE { }
            OPTIONAL
}
```

-continued

```
TargetMBSFN-AreaList-r12 ::=            SEQUENCE (SIZE
(0..maxMBSFN-Area)) OF TargetMBSFN-Area-r12
TargetMBSFN-Area-r12 ::=                SEQUENCE {
        mbsfh-AreaId-r12                MBSFN-AreaId-r12
        OPTIONAL, -- Need OR
        carrierFreq-r12                 ARFCN-ValueEUTRA-r9,
        ...
}
-- ASN1STOP
```

The logged measurements may comprise e.g.
Configuration of downlink pilot strength measurements logging
Configuration of Multicast-broadcast single-frequency network (MBSFN) measurement logging for E-UTRA
Configuration of the triggering of logging events: Only periodic measurement trigger is supported where the logging interval is configurable. Besides the period of measurements, a period for storing the measurements is given. It is configured in seconds in multiples of applied IDLE mode discontinuous reception (DRX), i.e., multiples of 1.28 s. UE behavior is unspecified when UE is configured with DRX cycle larger than logging interval
Configuration of logging duration: Defines a timer that is activated when the MDT configuration is sent to a UE and continues independently of state changes, radio access technology (RAT) or registered public land mobile network (RPLMN) changes. When timer expires, logging stops and configuration is cleared (except those parameters required for further reporting e.g., network absolute time stamp, trace reference, trace recording session reference and trace collection entity (TCE) Id)
Network Absolute time stamp to be used as a time reference to UE
Trace Reference parameter is indicated by OAM
Trace Recording Session Reference is indicated by OAM
Target cell identifier (TCI) is indicated by OAM
MDT public land mobile network (PLMN) List: Indicates the PLMNs where measurement collection and log reporting is allowed. Depends on whether MDT is initiated by signaling (Signalling Based MDT PLMN List) or area based (Management Based MDT PLMN List)
Configuration of a logging area (optionally): UE will log measurements if it is within a configured logging area which may consist of
a list of up to 32 global cell identities. If this list is configured, the UE will only log measurements when camping in any of these cells
a list of up to 8 tracking areas (TAs) or 8 location areas (LAs) or 8 routing areas (RAs). If this list is configured, the UE will only log measurements when camping in any cell belonging to the preconfigured TA/LA/RAs
Configured logging area can span PLMNs in the MDT PLMN List. If no area is configured, then a UE will log measurements on all the PLMNS of the MDT PLMN List
Configuration of target MBSFN area(s) for MBSFN measurement logging (optional)
Configuration of WLAN measurements (optional): UE attempts to obtain WLAN measurements
Configuration of Bluetooth measurements (optional): UE attempts to obtain Bluetooth measurements Logged measurement configurations and logs may be maintained when UE is in any state of a RAT even if there exist multiple periods of interruptions when UE is in a different RAT. There may be a single logged measurement configuration for Logged MDT in the UE for a RAT. When network provides a configuration, previously configured logged measurement configurations may be replaced by the new one. Logged measurements corresponding to previous configuration may be cleared also. In this case, network should be able to retrieve data before it is deleted, e.g., when a new configuration is given to the UE.

UE may perform WLAN and Bluetooth measurements only when indicated in the logging configuration. Measurement logging is performed during logging intervals for which WLAN and Bluetooth measurements are available. For instance, measurement quantities for WLAN consist of service set identifier (SSID), basic SSID (BSSID), homogeneous extended SSID (HESSID) of WLAN access points (APs) and optionally received signal strength indicator (RSSI) and round-trip time (RTT). For Bluetooth, measurement logging comprises MAC address of Bluetooth beacons and optionally available RSSI.

UE may collect MDT measurements and logs according to its configuration until its memory reserved for MDT is full. If this happens, UE stops logging, stops the log duration timer and starts another timer, e.g. the 48 hour timer.

A radio access network (RAN) optimization algorithm may comprise an algorithm for optimizing and/or improving operation, performance and/or one or more functions of a RAN. RAN optimization may comprise, for example, increasing or decreasing a priority of a service. RAN optimization, targeting end-user perception improvement, comprises e.g. capacity and coverage optimization, load sharing, load balancing, random access channel (RACH) optimization and energy saving. These functions may be optimized by SON algorithms. A radio access network optimization algorithm may be implemented with, for example, a machine learning technology. The use of ML is applicable in SON solutions as well.

Machine learning (ML) refers to algorithms and statistical models that computer systems use to perform a specific task without using explicit instructions, relying on patterns and inference instead. It is seen as a subset of artificial intelligence. Machine learning algorithms build a mathematical model based on sample data, known as "training data", in order to make predictions or decisions without being explicitly programmed to perform the task. ML algorithms may be categorized e.g. into supervised, unsupervised, and reinforcement learning. An ML algorithm may be composed of one or several ML components forming a, so called, ML pipeline, where each component may be placed and executed in different RAN network functions and/or in the UE itself. Some examples of network functions are the central unit (CU) which can be further separated into a centralized unit control plane (CU-UP) and a centralized unit user plane (CU-UP) and the decentralized unit (DU) in split architectures, a network node, e.g. gNB, and/or a RAN external entity such as radio intelligent controller (RIC).

Limited and specific set of MDT data is needed for the ML-based RAN algorithms to enable real-time or near real-time execution.

There is provided new control plane (C-plane) signalling over RAN interfaces. There is provided an apparatus and a method for enabling network functions, i.e. data consumers, to request and receive tailored MDT data in real-time or near real-time. Near real-time here may be understood e.g. as in the order of hundreds of milliseconds. The tailored MDT data may be received from data producers, e.g. from one or more UEs and/or one or more RAN network functions. The data producer may be a UE or a set of UEs that performs the measurements or an entity that requests one or more UEs to perform the measurements. The data producer sends the measurement results as a response to the consumer. The tailored data may be used by the consumer network function for executing and training the ML algorithm(s).

The apparatus capable of performing the method is described below.

Figure 3:
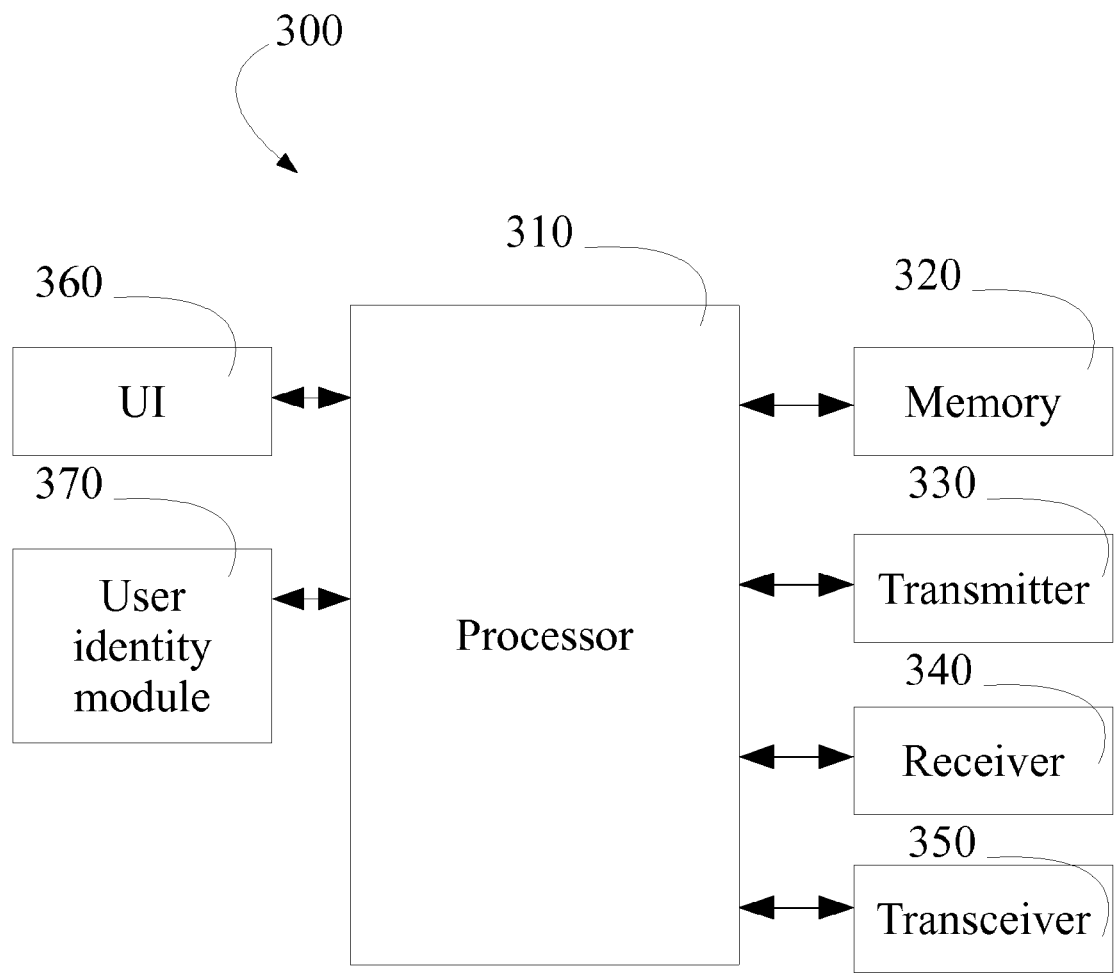
FIG. 3 shows, by way of example, a block diagram of an apparatus.

FIG. 3 shows, by way of an example, a block diagram of an apparatus 300. Illustrated is an apparatus or device 300, which may comprise, for example, a network node, or a mobile communication device such as a user device or user equipment UE, or the entity where the ML algorithm is placed, or an entity triggered by the entity hosting the ML. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions, e.g. the method(s) as disclosed herein.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with a mobile communication system standard, such as 5G, long term evolution, LTE, wireless local area network, WLAN and/or Ethernet.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected.

Figure 4:
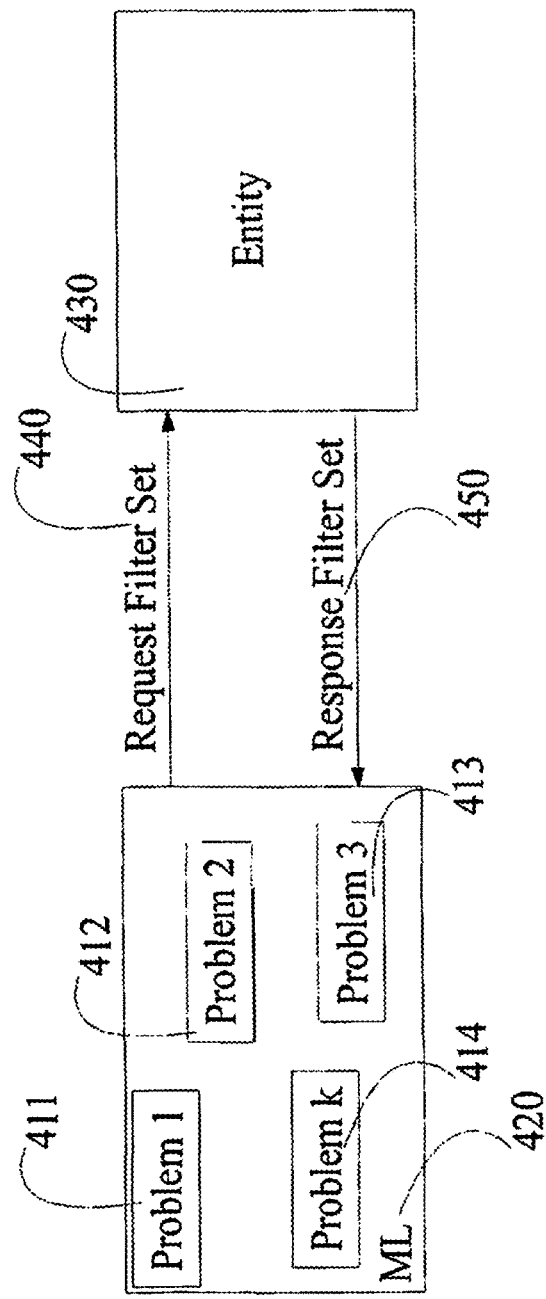
FIG. 4 shows, by way of example, a set of different machine learning (ML) optimization problems within ML entity, and a data producer.

FIG. 4 shows, by way of example, a set of different ML optimization problems 411, 412, 413, 414 within a consumer, e.g. an ML entity 420, and a producer entity 430. ML entity 420 may be considered as an entity that solves a set of k ML optimization problems, e.g. Problem 1 411, Problem 2 412, Problem 3 413 . . . and Problem k 414. The ML optimization problems may correspond to some SON use cases, e.g. random access channel (RACH) optimization, mobility robustness optimization (MRO) and/or coverage capacity optimization (CCO) for example but could be more general and involve newly defined problems identified as part of lower or higher layer operations. Each problem may be associated with a set of measurements needed by the ML in order to solve it. The ML entity 420 may be e.g. a UE or a RAN network function or may be a network function that resides outside RAN. The ML algorithm(s) are executed with needed measurements provided from a UE or another network function that own the needed measurements. The ML may be deployed in different entities, i.e. the network function that requests the measurements may be e.g. CU, DU, both CU and DU, a network node, e.g. gNB, RIC, etc.

The ML algorithm may reside on a single network entity or may be distributed in multiple network entities. The data producer 430 then depends on the place where the ML is deployed and the location of the data needed for the ML algorithm. Location of the needed data may depend on the type of the measurements, as some measurements are associated with higher layers and others with lower layers. The data producer may be e.g. one or more UEs or an entity that requests one or more UEs to perform measurements. In open RAN (O-RAN), the data producer may be e.g. the radio intelligent controller (RIC).

The ML entity 420 may request 440 the set of measurements from the data producer 430. The measurement request may be the message "Request Filter Set". Filter sets may be specified, which comprise a set of quadruplets of {"UE identity"; "UE measurements"; "Time sampling indication"; "Granularity"} that allows a given entity, e.g. the data producer 430, to request specific measurements for one or more UEs. In case the measurement request is sent directly to one or more UEs from a network entity, the quadruplets of measurement data become triplets, i.e. {"UE measurements"; "Time sampling indication"; "Granularity"}.

The data producer 430 may act according to request, and transmit 450 a response message, e.g. "Response Filter Set" to the ML entity 420. Alternatively, the existing UE Information Request/Response messages may be reused, wherein the filter set information is passed or transmitted as an information element.

The ML entity 420 may identify and/or select the set of UEs from which to request data. Those UEs may be identified e.g. through specific UE Identities. Alternatively, or in addition, those UEs may be identified and/or selected which satisfy certain pre-defined conditions: e.g., "UEs whose throughput is below a threshold", "UEs whose reference signal received power (RSRP) values are below a certain threshold", "UEs whose reference signal received quality (RSRQ) values are within a certain window", "UEs whose handover failed more than a certain number of times in a certain area", etc. When the step of identifying the UEs from which to request data is completed, the quadruplets of measurement data become triplets, i.e. {"UE measurements"; "Time sampling indication"; "Granularity"}.

Let us consider a set of all available measurements m that would be needed to solve a set of k ML optimization problems. Let us denote by M(j) the jth measurement out of a set of m measurements and create a binary vector of those measurements [M(1), M(2), . . . , M(m)] to signal all possible subsets ($2^{m-1}$ such possibilities). In the binary vector a value of one (1) indicates that the measurement is indicated and a value of zero (0) indicates that the measurement is not indicated. For example, a measurement may be mobility state estimation (MSE)/location, radio link failure (RLF)/beam, random access channel (RACH) contention resolution failure/resource/beam, #RACH preambles/resource/beam, Reference Signals Received Power (RSRP), Signal to Interference plus Noise Ratio (SINR) or other physical layer measurements, etc.

The measurement M(j) may be associated with a time sampling indication. The time sampling indication may give information regarding the starting time when the measurement will be collected, the ending time and the time frequency of the sampling. Time frequency of the sampling may indicate how often and with which pattern between the starting and ending times data will be collected. The time sampling indication may comprise the necessary time units of those times, e.g. seconds, milliseconds, hours, days, etc.

Alternatively, to the pre-defined time sampling indication, the starting time, ending time and/or the frequency of the sampling, may be event-based. This means that the measurements may be collected when a certain event is satisfied. The measurements may be collected e.g. in a non-deterministic and aperiodic fashion. Example of such events can be nonfailure related conditions, e.g.: "RSRP drops below a threshold", "handover failure" (e.g., on a certain beam index or location or combination of the above), "RACH failure on given resources" (in terms of frequency, time, beam index, preamble or a combination of those parameters).

A few, non-limiting, examples of time sampling indication are given below.

Time sampling indication may be defined with a fixed period with which measurements are collected. In addition, the start and/or end times of the measurement collection period and/or the period itself may be indicated in the time sampling indication (together with their respective units, e.g., minutes, seconds, hours, days, etc.). Alternatively, the start time may be event-based, i.e. the entity may start taking measurements once an event is observed. The end time may be also event-based, i.e., the entity may finish taking of measurements when another event is observed.

When the time sampling indication is defined as event-based measurement collection, the measurements are collected when a certain event is observed. The starting and/or ending times may be time-based or event-based times.

Time sampling indication may be defined with a schedule that gives a pattern with which to collect the measurements. The schedule comprises start times and end times of the measurement periods. Such time sampling indication can be useful in cases for example of deterministic traffic as being discussed for Ultra Reliable Low Latency Communications (URLLC). When traffic arrives in a deterministic fashion some events e.g., transmission collisions, interference, throughput updates, etc., are expected to follow a certain pattern. Also, deterministic or semi-deterministic mobility for factory automation applications would create events that follow a deterministic pattern, e.g., when it comes to handover failures. Alternatively, the start times and end times may be determined as event-based. The units of the starting and ending times and the schedule may also be indicated.

The measurement M(j) may be associated with a granularity with which it will be collected. For example, if a measurement is tied to a location, e.g. observing a certain quantity/location, the location may be a point (x,y,z) or it may be a larger location, such as a cell edge or a coverage hole. If the measurement is tied to a beam, e.g. observing a certain quantity/beam, its granularity may be an index of the beam or a grid of beams.

Figure 5:
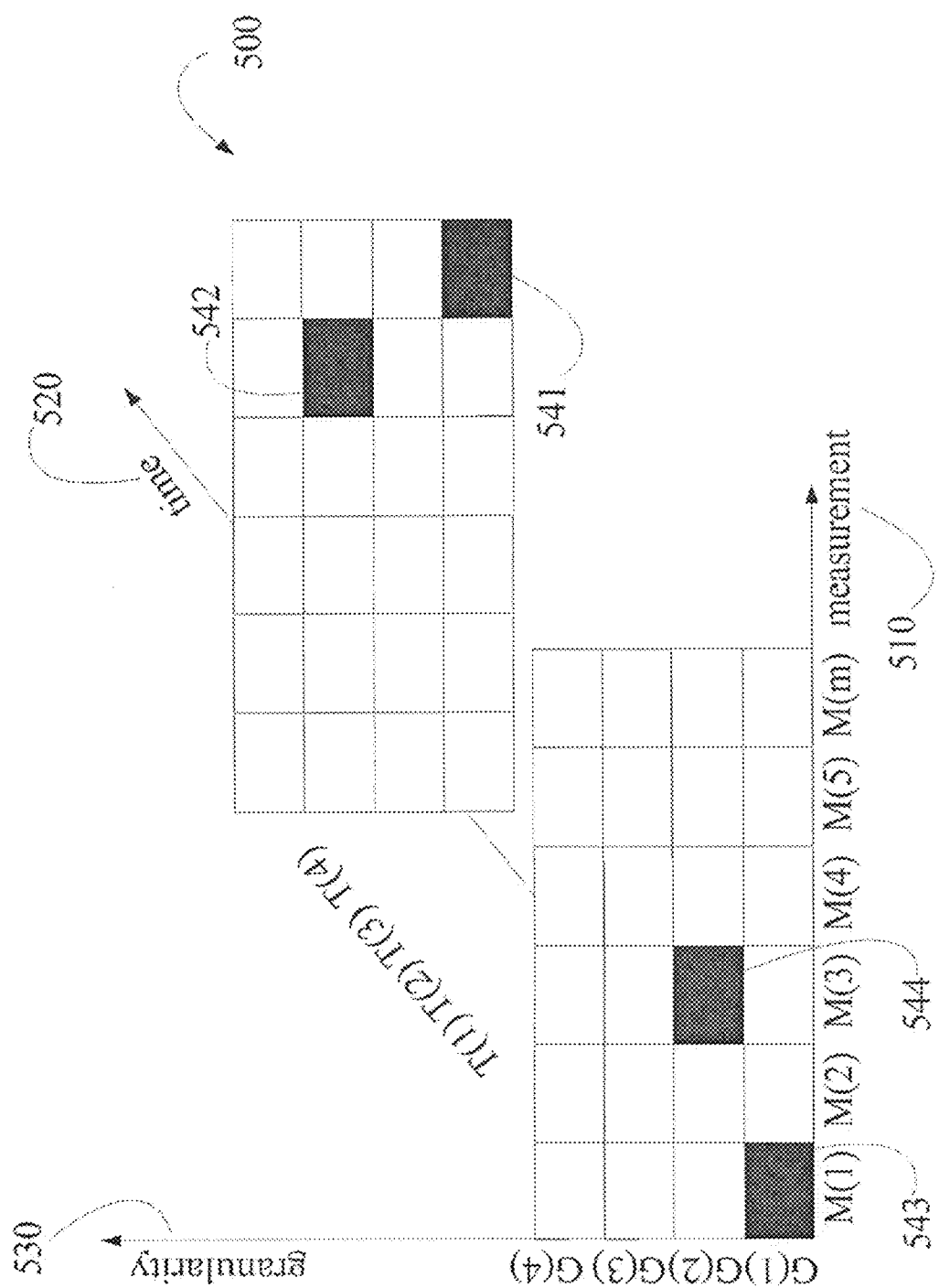
FIG. 5 shows, by way of example, a filter set representation.

FIG. 5 shows, by way of example, a filter set representation 500. In this example, the UEs from which measurements are requested are assumed to be pre-selected. Thus, in FIG. 5, the fourth dimension, the UE Identities, or the set of UE-Id(s) that need to collect the measurements, is not shown, and the message comprising the filter sets is represented in three dimensions, i.e., x, y and z. Effectively, the message in FIG. 5 is the message that will be received by a given (pre-selected) UE.

The filter set may be a 4-dimensional matrix, pointing to a set of specific identified UEs (or UE satisfying certain events) from which measurements are requested, or 3-dimensional in which the selection of the UEs has already taken place. The number of dimensions of the filter set depends on the recipient, namely if it is a UE or another network function. If the filter set message is sent to a CU, for example, then the CU may indicate from which UEs it requests the measurements.

The x dimension 510 represents measurements, e.g. all possible measurements, e.g. M(1), M(2), M(3), M(4), M(5) . . . M(m). The y dimension 520 represents the possible time sampling indications, e.g. T(1), T(2), T(3), T(4) . . . . The z dimension 530 represents the granularity, e.g. G(1), G(2), G(3), G(4) . . . . The (x,y,z) components that are black, i.e. the components 541, 542, 543, 544 in the matrix in FIG. 5 represent the filtered measurements that are requested by an entity (by a data consumer). The entity receiving the message (data producer) will send the filtered measurements to the data consumer. Additionally, the black components represent with which sampling and granularity these measurements are needed. The black components in FIG. 5 correspond to a tailored set of measurements, which may be named as a filter set. The filter set may be created by taking one or more subset over all relevant measurements.

All the measurements may be indicated to all the UEs (UEs, set of UEs or UE Types) or other network entities (CU, DU, gNB, RIC, etc.), even if all of those do not collect all the measurements. When a new measurement is added or replaced, the matrix may be redefined appropriately.

As an alternative to indicating all the measurements to the UEs or network entities, only relevant entries of the matrix may be communicated. For example, an array or vector of measurements IDs to be activated or deactivated may be indicated in a configuration message towards the entity, from which the measurements are requested, by the entity gathering the measurements. This kind of dynamic implementation enables reduction of the matrix size by avoiding unnecessary elements. Communication of the relevant entries of the matrix may be carried out by the configuration message, e.g. Configure Filter Set Message.

A filter set pertains to a particular ML optimization problem 1, 2, . . . , k, where the problem corresponds to a certain use case in the network, targeting an issue and an optimization need. The optimization need may be, for example, coverage and capacity optimization (CCO), Mobility Robustness Optimization (MRO), QoS verification, RACH Optimization, Common Channel Parameterization (CCP), etc.

Measurement filters, corresponding to filters in the x dimension of FIG. 5, may be e.g.

k=1 CCO, CCO Measurement Filter Set={Radio level measurements: RSRP/RSRQ/signal-to-noise and interference ratio (SINR), beam, global navigation satellite system (GNSS), RLF reports} k=2 MRO, MRO Measurement Filter Set={RLF reports, handover failure (HOF) reports, beam failure recovery (BFR), GNSS, physical cell identifier (PCI), etc.} k=3 QoS, QoS Measurement Filter Set={Delay, Throughput, Packet Drop Rate, GNSS, etc.} k=4 RACH, RACH Measurement Filter Set={#RACH preambles/resource/beam, RACH contention resolution failure/resource/beam, etc.} k=4 CCP, CCP Measurement Filter Set={#RACH preambles, #Connection establishment failures, etc.}

This kind of definition of the filter sets enables defining new ML optimization problems. It further allows defining own filter sets mapped to a given optimization problem in a proprietary way.

The ML entity, in need of certain measurement(s), may configure filter sets for a certain ML optimization problem k' at the data producer or directly at a UE. A single filter set may be mapped to a given ML optimization problem. Alternatively, multiple filter sets may be mapped to a single optimization problem. For example, for an ML optimization problem where both immediate and logged MDT measurements are required, multiple filter sets may be mapped to a single optimization problem.

The ML optimization problem may be signaled explicitly in the configuration message and/or in the request/response messages for the filter set. Once the configuration is completed, the ML entity may request "measurements to solve optimization problem k'" and also request certain filter sets, e.g. a subset of the configured ones. Thus, the entity requesting the measurements indicates also the purpose of the measurements, in addition to which measurements it requests. When the configuration and/or the request/response procedures are explicitly tied to a particular ML optimization problem, and it is indicated to the entity from which measurement are requested, e.g. the data producer, additional intelligence is added to the entity from which measurement are requested.

Figure 6A:
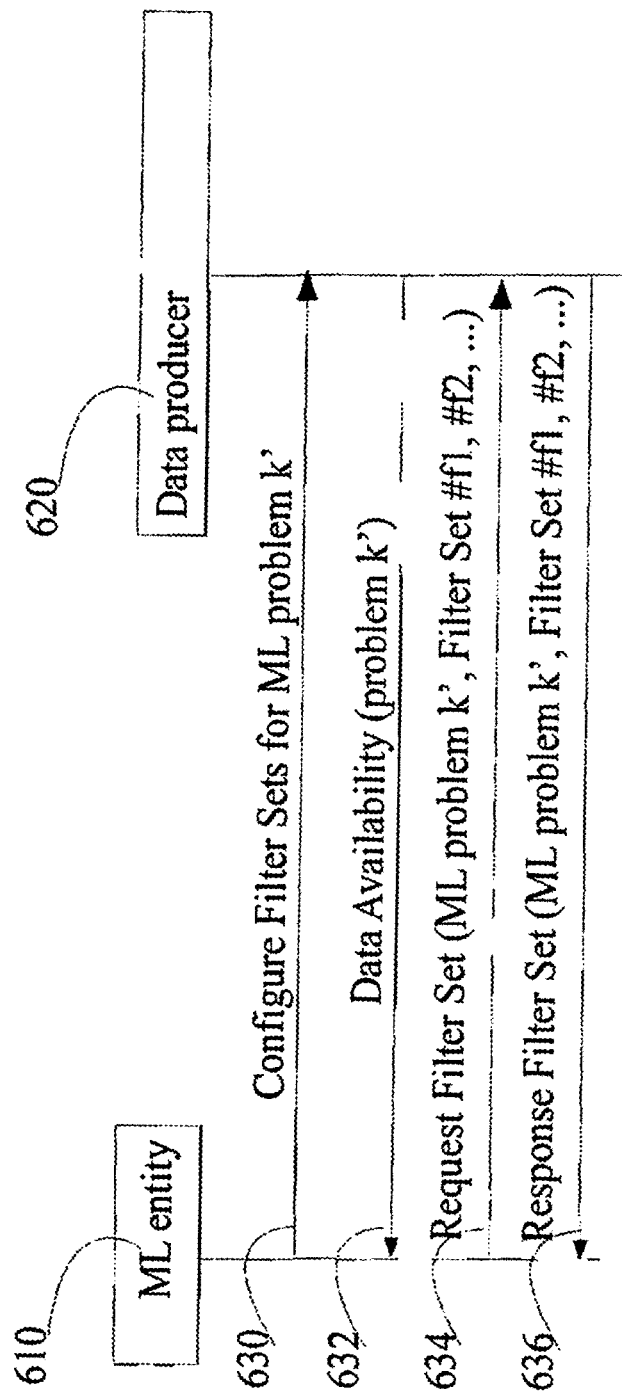
FIG. 6a shows, by way of example, signaling between ML entity and a data producer.

FIG. 6a shows, by way of example, signaling between ML entity 610 and a data producer 620. The ML entity 610 configures 630 filter sets for a certain ML optimization problem k' at the data producer 620. Measurement configurations and requests to a data producer are tied to a specific ML optimization problem which is indicated to the data producer. The data producer may start performing the measurements and/or collecting the measurements from one or more UEs. The data producer 620 transmits 632 a message on data availability regarding the specific problem k' to the ML entity 610. The message on data availability may indicate that the data producer has collected the requested data for a particular problem. It may be that data becomes available at different points of time for different optimization problems. Thus, the data producer may transmit multiple messages on data availability regarding different optimization problems to the ML entity. ML entity transmits 634 the measurement request "Request Filter Set" to the data producer 620. Filter sets may specify the set of the UEs from which measurements are requested by indicating the identity of UEs from which measurement should be collected in the measurement request, i.e. the filter set is four dimensional. In the measurement request, i.e. the message "Request Filter Set", the ML optimization problem is given as an argument of the request and specific measurements are mapped to a certain optimization problem. Different Filter Sets are denoted as #f1, #f2 . . . . The data producer acts according to the request, and then transmits 636 a message "Response Filter Set" to the ML entity. The ML entity receives the message "Response Filter Set" from the data producer. The existing UE Information Request/Response messages may be reused, wherein the filter set information is passed or transmitted as an information element.

Figure 6B:
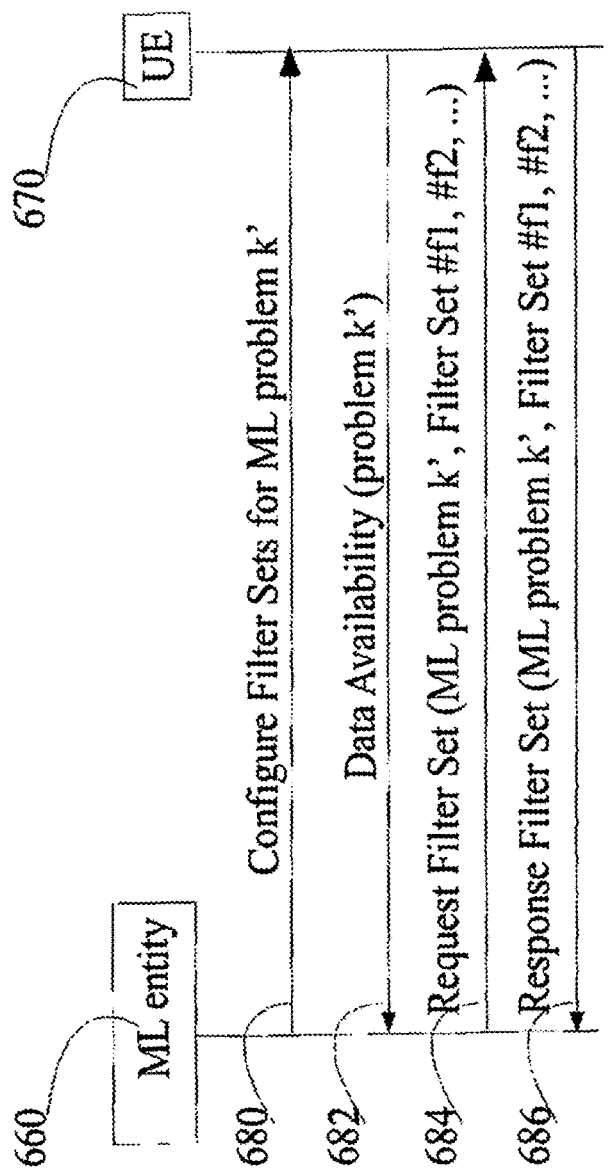
FIG. 6b shows, by way of example, signaling between ML entity and UE.

FIG. 6b shows, by way of example, signaling between ML entity 660 and UE 670. In this example, the data producer is the UE. The ML entity 660 configures 680 filter sets for a certain ML optimization problem k' at the UE 670. Measurement configurations and requests to the UE are tied to a specific ML optimization problem which is indicated to the UE. The UE 670 transmits 682 a message on data availability regarding the specific problem k' to the ML entity 660. ML entity 660 transmits 684 the measurement request "Request Filter Set" to the UE 670. In this case, the filter set is three dimensional, i.e. the UE information is already interpreted by configuring and requesting measurements from specific UEs. In the measurement request, i.e. the message "Request Filter Set" the ML optimization problem is given as an argument of the request and specific measurements are mapped to a certain optimization problem. Different Filter Sets are denoted as #f1, #f2 . . . . The UE acts according to the request, and then transmits 686 a message "Response Filter Set" to the ML entity. The ML entity receives the message "Response Filter Set" from the UE.

The UE that receives a request for specific filter sets and takes the measurements may store the measurements to its local memory until it obtains all the needed information. When all the needed measurements have been taken, the UE sends the measurements back to the data producer or to the ML entity. It may be that the data is not processed at the UE in order to reduce volume or UE may additionally process the data.

The procedures in FIG. 6a and in FIG. 6b will yield in the response filter set message a matrix of the form in FIG. 5. In the response filter set message the UEs from which measurements are obtained may be appended in the response. Those UEs may be a subset of the UEs from which measurements are requested or all the UEs indicated in the request filter set message. For instance, if the measurements are measuring average throughput over a set of UEs and if not all UEs report throughput measurements, the requesting entity should be aware of which UEs provided measurements. As an alternative, in the response filter set message the UE indication is omitted, i.e., the 4-dimensional matrix becomes 3-dimensional.

Referring back to FIG. 6b, i.e. when measurement configuration involves configuration at a UE, configuration may be done by introducing a new configuration message or by reusing the LoggedMeasurementConfiguration message to include the filter sets. The configuration message may also indicate the ML optimization problem for which the measurements are requested which gives an indication that data is requested for ML purposes.

It is to be noted, that even though the ML entity is sending the configuration message in the examples of FIG. 6a and FIG. 6b, the entity sending the configuration message may alternatively be an entity triggered by the entity hosting the ML.

Figure 7A:
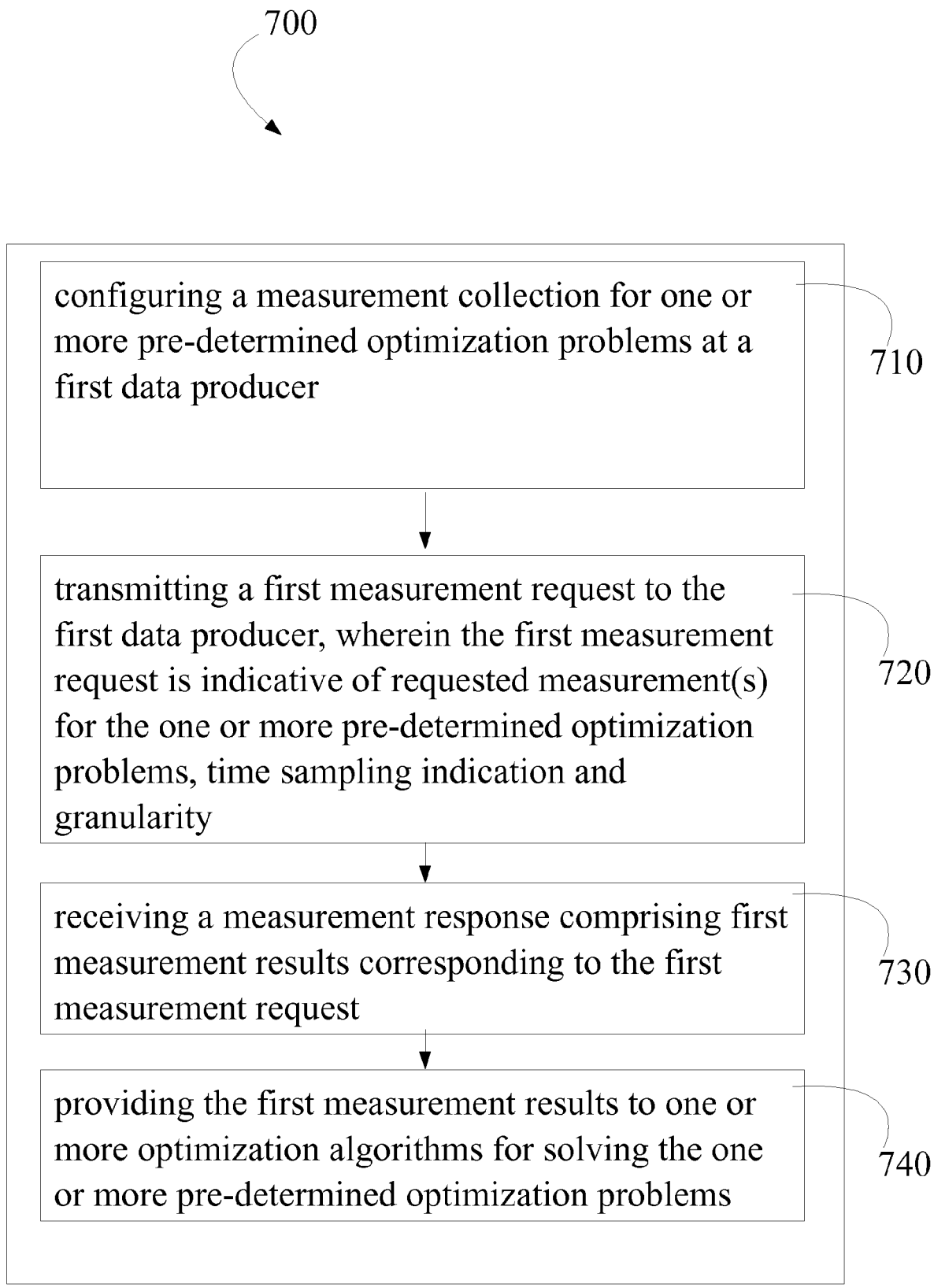
FIG. 7a shows, by way of example, a flow chart of a method for radio access network data collection.

FIG. 7a shows, by way of example, a flow chart of a method for RAN data collection. The phases of the method 700 may be performed e.g. by the device 300, e.g. the ML entity, or an entity triggered by the entity hosting the ML. The method 700 comprises configuring 710 a measurement collection for one or more pre-determined optimization problems at a first data producer. The method 700 comprises transmitting 720 a first measurement request to the first data producer, wherein the first measurement request is indicative of requested measurement(s) for the one or more pre-determined optimization problems, time sampling indication and granularity. The method 700 comprises receiving 730 a measurement response comprising first measurement results corresponding to the first measurement request. The method 700 comprises providing 740 the first measurement results to one or more optimization algorithms for solving the one or more pre-determined optimization problems.

Figure 7B:
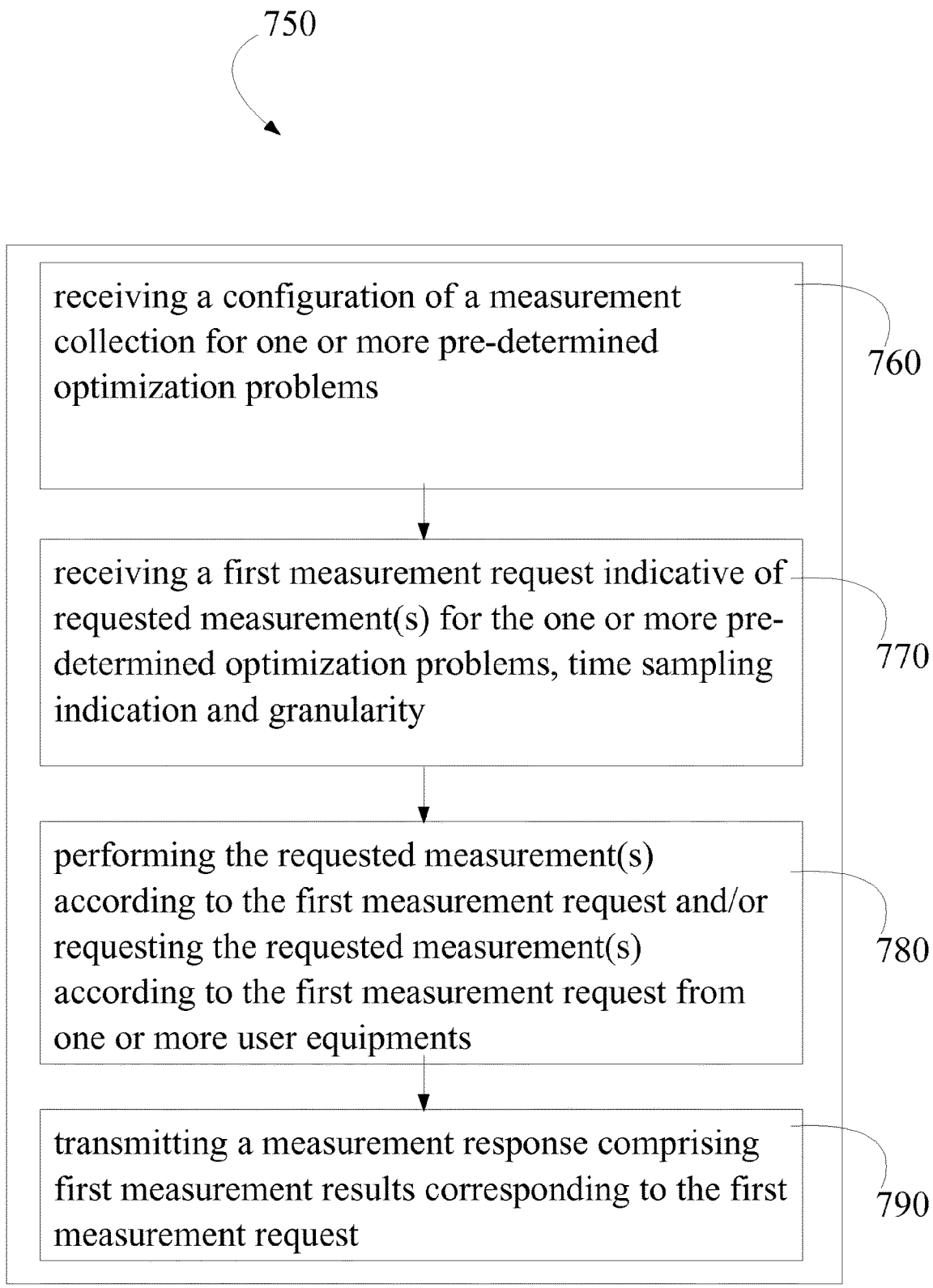
FIG. 7b shows, by way of example, a flow chart of a method for radio access network data collection.

FIG. 7b shows, by way of example, a flow chart of a method for RAN data collection. The phases of the method 750 may be performed e.g. by the device 300, e.g. the data producer such as an UE or an entity that requests one or more UEs to perform the requested measurements. The method 750 comprises receiving 760 a configuration of a measurement collection for one or more pre-determined optimization problems. The configuration may be received e.g. from the ML entity. The method 750 comprises receiving 770 a first measurement request indicative of requested measurement(s) for the one or more pre-determined optimization problems, time sampling indication and granularity. The method 750 comprises performing 780 the requested measurement(s) according to the first measurement request and/or requesting the requested measurement(s) according to the first measurement request from one or more user equipments. The method 750 comprises transmitting 790 a measurement response comprising first measurement results corresponding to the first measurement request. The measurement response may be transmitted e.g. to the ML entity.

The method, wherein a tailored measurement request is used, enables collecting and reporting the data in an efficient way, which helps the UEs to better utilize their resources, such as memory and battery. In addition, by smartly collecting the measurements at the UEs, the network may process received measurements faster and use less storage and processing resources. The methods may be applied to both Immediate MDT and Logged MDT.

Measurement requests and/or measurement responses, i.e. Request Filter Set and/or Response Filter Set messages, may be sent over different interfaces depending on the location where the ML entity is placed. For example, in CU/DU architectures the signalling for MDT data collection may be over F1/E1 interface; over X2/Xn interface between gNBs or eNBs; over E2 and/or A1 interfaces in O-RAN.

Figure 8:
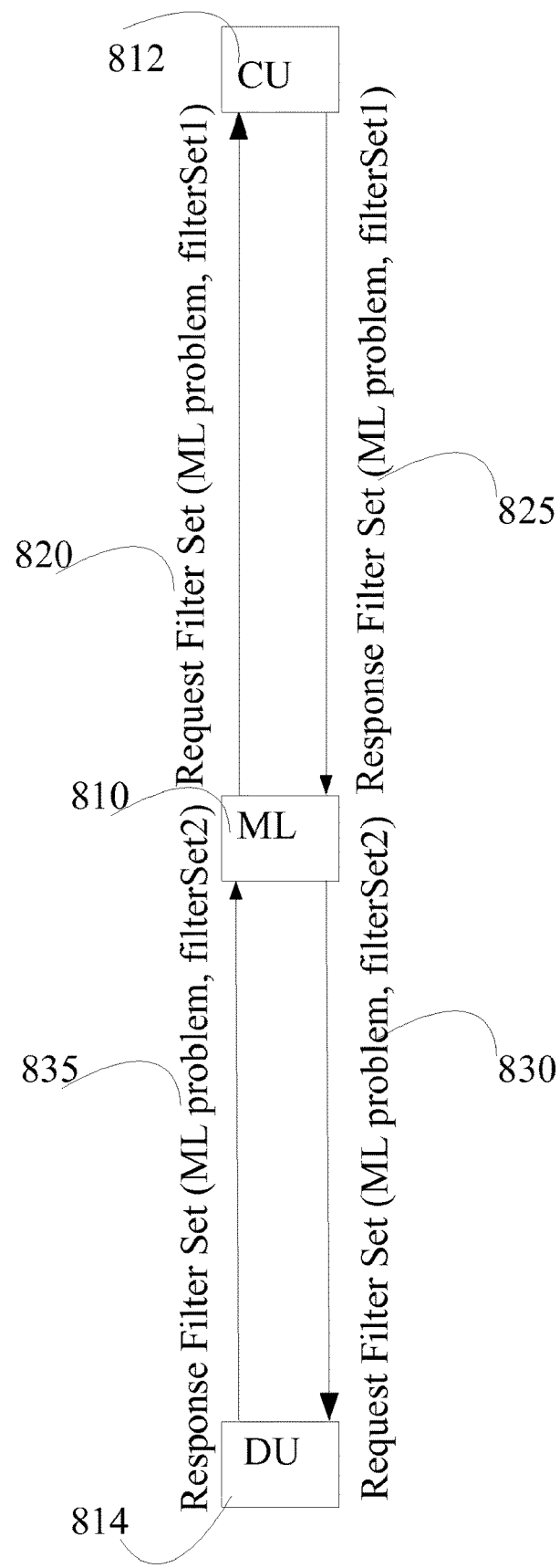
FIG. 8 shows, by way of example, signalling between entities.

In case of split architectures, the overall set of measurements may be split into two different parts, namely measurements that are collected from a CU and measurements that are collected from a DU. Measurements may be collected from a first data producer and from a second data producer. FIG. 8 shows, by way of example, signalling between entities, wherein the ML is placed in a RAN external entity. The RAN external entity may be e.g. the RIC in O-RAN or TCE in the OAM domain. The ML entity 810 may transmit 820 a measurement request to CU 812, and receive 825 a measurement response from the CU 812. In other words, the ML entity 810 may trigger a Request Filter Set procedure 820 and a Response Filter Set procedure 825 over the ML-CU 812 interface. The set of measurements triggered by the CU may be named as a first set of measurements, i.e. filterSet1. The set of measurements triggered by the DU may be named as a second set of measurements, i.e. filterSet2.

The ML entity may transmit 830 a measurement request to DU 814, and receive 835 a measurement response from the DU 814. In other words, the ML entity 810 may trigger a Request Filter Set procedure 830 and a Response Filter Set procedure 835 over the ML-DU 814 interface. In the measurement request message "Request Filter Set", the ML entity may indicate the pre-determined ML problem for which measurement results are needed. In addition, a set of UEs from which measurements should be obtained may be indicated in the measurement request message. For example, those UEs could be UEs satisfying a certain condition or UEs identified through certain identifiers.

When CU 812 and DU 814 receive the Requests for Filter Sets from the ML entity, and if those Filter Sets involve measurements from UEs, they subsequently send the corresponding measurement configuration messages at the UEs for the requested ML Problems and Filter Sets. From this process filterSet1 and filterSet2 are obtained. Measurements that are to be collected from the CU or from the DU are different since naturally the two entities handle different types of information. The CU deals with higher layer information as opposed to the DU which handles more physical layer information. The ML entity that receives both filterSet1 and filterSet2 can use them to optimize its ML optimization problems.

Figure 9A:
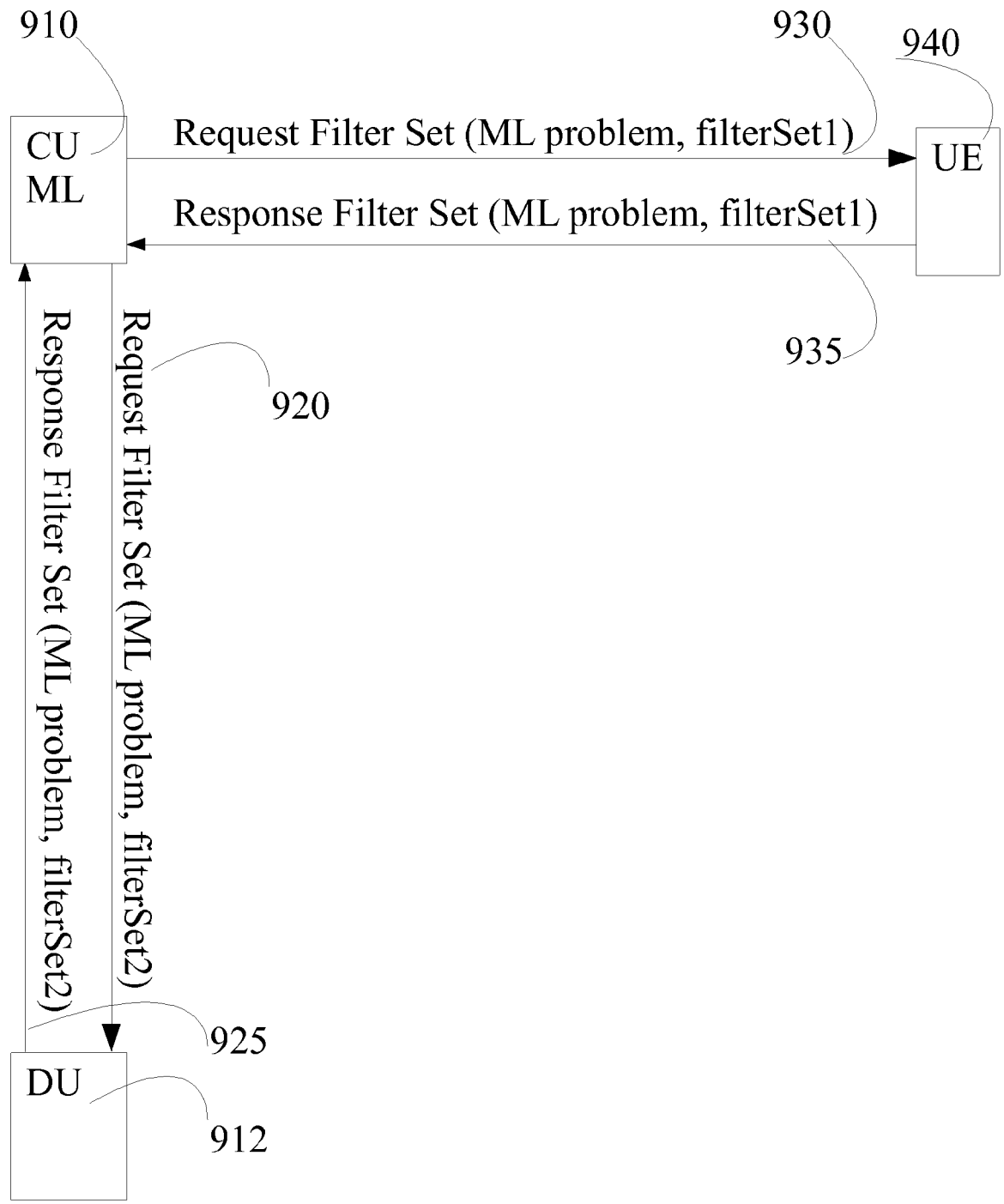
FIG. 9a shows, by way of example, signalling between entities.

FIG. 9a shows, by way of example, signalling between entities, wherein the ML is placed at the CU 910. The ML at the CU 910, i.e. the ML entity in this example, may transmit 920 a measurement request to DU 912, and receive 925 a measurement response from the DU 912. In other words, the ML at the CU may trigger a Request Filter Set procedure 920 and a Response Filter Set procedure 925 over the F1 interface with the DU 912, or through some newly defined interface that could interconnect ML entities between CU and DUs. The ML at the CU may obtain, from these procedures, a set of measurements given by filterSet2. A set of UEs from which measurements should be obtained may be indicated in the measurement request message. For example, those UEs could be UEs satisfying a certain condition or UEs identified through certain identifiers. In addition, the pre-determined ML problem for which measurement results are needed may be indicated in the measurement request.

The ML at the CU may transmit 930 a measurement request to one or more UEs 940, and receive 935 a measurement response from the one or more UEs 940. In other words, the ML at the CU may trigger measurement collection from specific UEs by sending Request Filter Set to certain UEs and receiving Response Filter Set from the UEs. UE information may exist as part of the source and/or destination of the Request Filter Set. Hence, in this example, no UE indication is included in the Request Filter Set message. From this process ML may obtain a set of measurements given by filterSet1. Having both filterSet1 and filterSet2 the ML at the CU may use the measurement results given by the filterSet1 and filterSet2 to optimize certain ML optimization problems. In the example of FIG. 9a, it may be assumed that the UEs 940 are already configured to collect the measurements for a given ML problem and filter set.

Figure 9B:
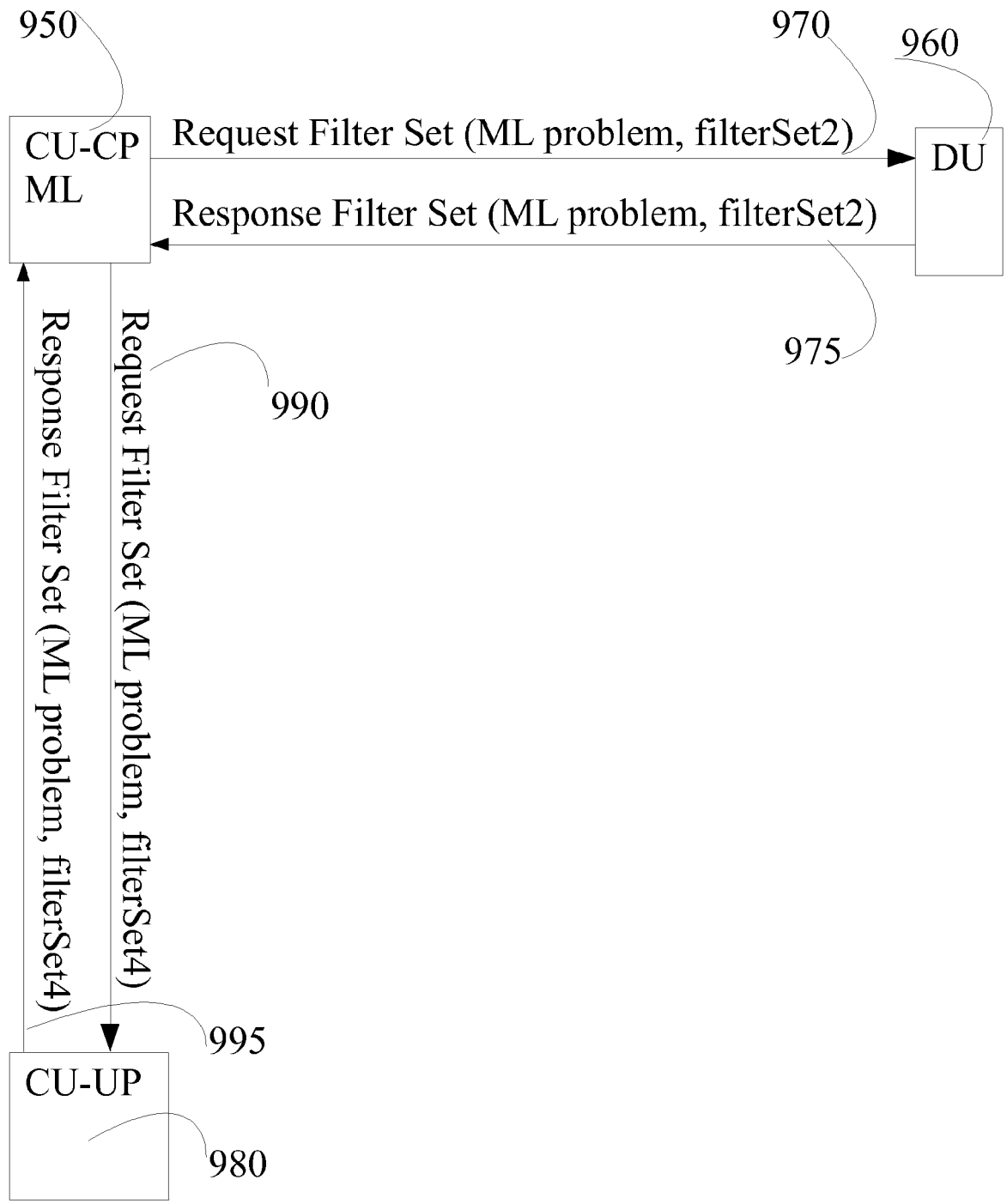
FIG. 9b shows, by way of example, signalling between entities.

FIG. 9b shows, by way of example, signalling between entities, wherein the ML is placed at the CU-CP 950. The ML at the at the CU-CP, i.e. the ML entity in this example, may transmit 970 a measurement request to DU 960, and receive 975 a measurement response from the DU 960. In other words, the ML at the CU-CP may trigger a Request Filter Set procedure 970 and a Response Filter Set procedure 975 over the F1 interface or through some newly defined interface that could interconnect ML entities between CU and DUs.

The ML at the CU-CP may obtain, from these procedures, a set of measurements given by filterSet2. A set of UEs from which measurements should be obtained may be indicated in the measurement request message. For example, those UEs could be UEs satisfying a certain condition or UEs identified through certain identifiers. In addition, the pre-determined ML problem for which measurement results are needed may be indicated in the measurement request.

The ML at the CU-CP 950 may transmit 990 a measurement request to CU-UP 980, and receive 995 a measurement response from the CU-UP 980. In other words, the ML at the CU-UP may trigger a Request Filter Set procedure 990 and a Response Filter Set procedure 995 over the E1 interface or through some newly defined interface that could interconnect ML entities between CU-CP and CU-UP. The ML at the CU-CP may obtain, from these procedures, a set of measurements given by filterSet4. Having both filterSet2 and filterSet4 the ML at the CU-CP may use the measurement results given by the filterSet2 and filterSet4 to optimize certain ML optimization problems, which may be different from each other. In the example of FIG. 9b, it may be assumed that the UEs are already configured to collect the measurements for a given ML problem and filter set.

Figure 10:
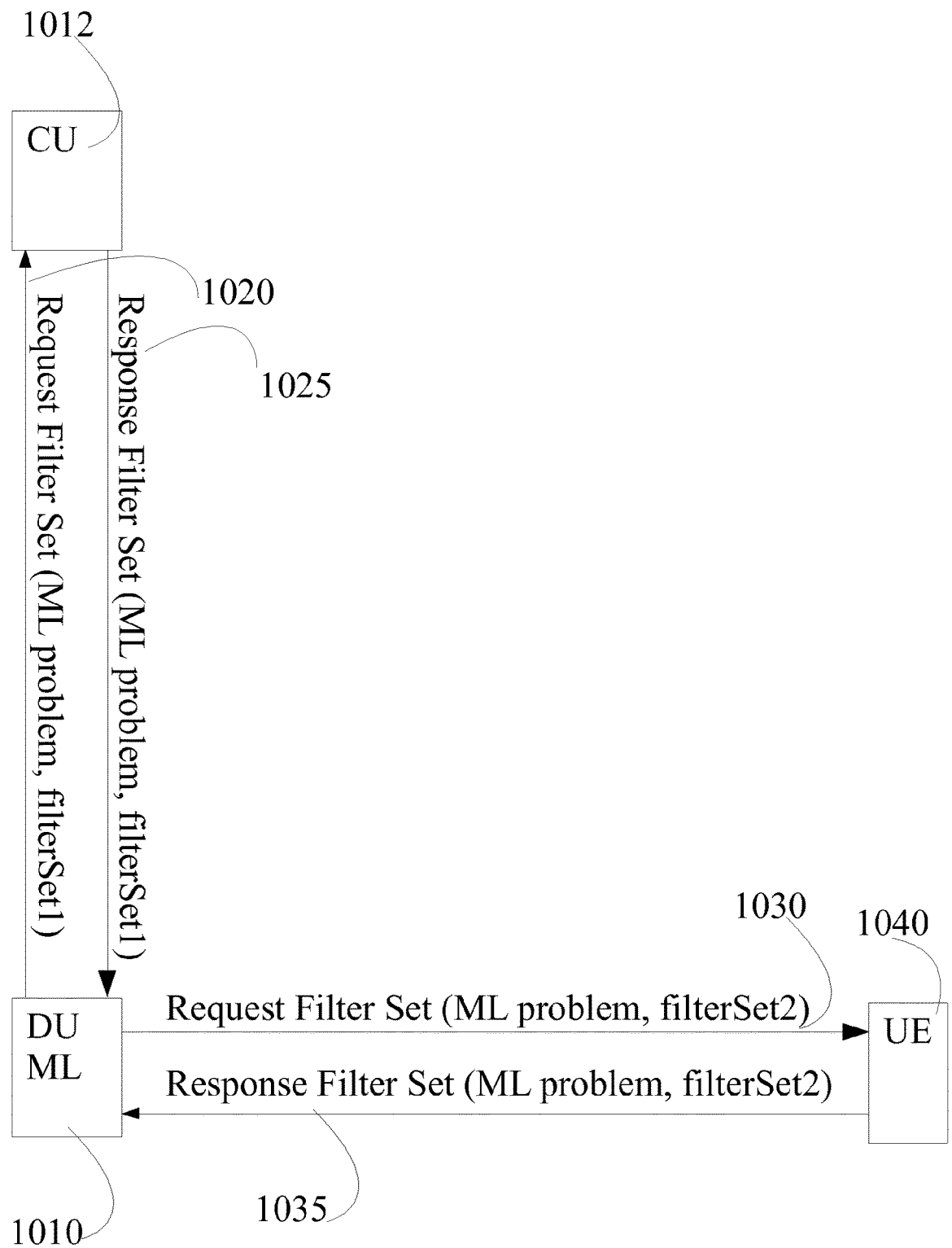
FIG. 10 shows, by way of example, signalling between entities.

FIG. 10 shows, by way of example, signalling between entities, wherein the ML is placed at the DU 1010. The ML at the DU 1010, i.e. the ML entity in this example, may transmit 1020 a measurement request to CU 1012, and receive 1025 a measurement response from the CU 1012. In other words, the ML at the DU may trigger a Request Filter Set procedure 1020 and a Response Filter Set procedure 1025 over the F1 interface with the CU 1012 or through some newly defined interface that could interconnect ML entities between CU and DUs. The ML at the DU may obtain, from these procedures, a set of measurements given by filterSet1. A set of UEs from which measurements should be obtained may be indicated in the measurement request message. For example, those UEs could be UEs satisfying a certain condition or UEs identified through certain identifiers. In addition, the pre-determined ML problem for which measurement results are needed may be indicated in the measurement request.

The ML at the DU may transmit 1030 a measurement request to one or more UEs 1040, and receive 1035 a measurement response from the one or more UEs 1040. In other words, the ML at the DU may trigger measurement collection from specific UEs by sending Request Filter Set to certain UEs and receiving Response Filter Set from the UEs. UE information may exist as part of the source and/or destination of the Request Filter Set. Hence, in this example, no UE indication is included in the Request Filter Set message. The ML may obtain a set of measurements given by filterSet2 from this process. Having both filterSet1 and filterSet2 the ML at the DU may use the measurement results given by the filterSet1 and filterSet2 to optimize certain ML optimization problems. In the example of FIG. 10, it may be assumed that the UEs 1040 are already configured to collect the measurements for a given ML problem and filter set.

Figure 11:
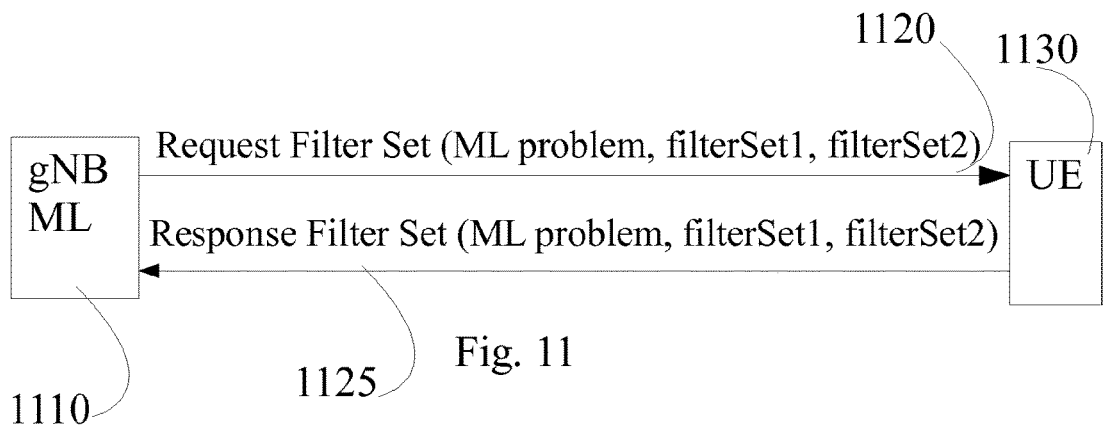
FIG. 11 shows, by way of example, signalling between entities.

FIG. 11 shows, by way of example, signalling between entities, wherein the ML is placed at a network node 1110, e.g. at the gNB. The ML may exist as an entity within the gNB, which does not support the fronthaul functional CU-DU split. The ML in the gNB 1110, i.e. the ML entity in this example, may transmit 1120 a measurement request to one or more UEs 1130, and receive 1125 a measurement response from the one or more UEs 1130. In other words, the ML at the gNB 1110 may trigger a Request Filter Set procedure 1120 and a Response Filter Set procedure 1125 directly from a set of UEs. The UEs may be identified through UE identifiers or they may be UEs satisfying a certain condition. The ML may obtain a set of measurements given by filterSet1 and filterSet2, which may be used by the ML to optimize certain ML optimization problems. In the example of FIG. 11, it may be assumed that the UEs are already configured to collect the measurements for a given ML problem and filter set.

Figure 12:
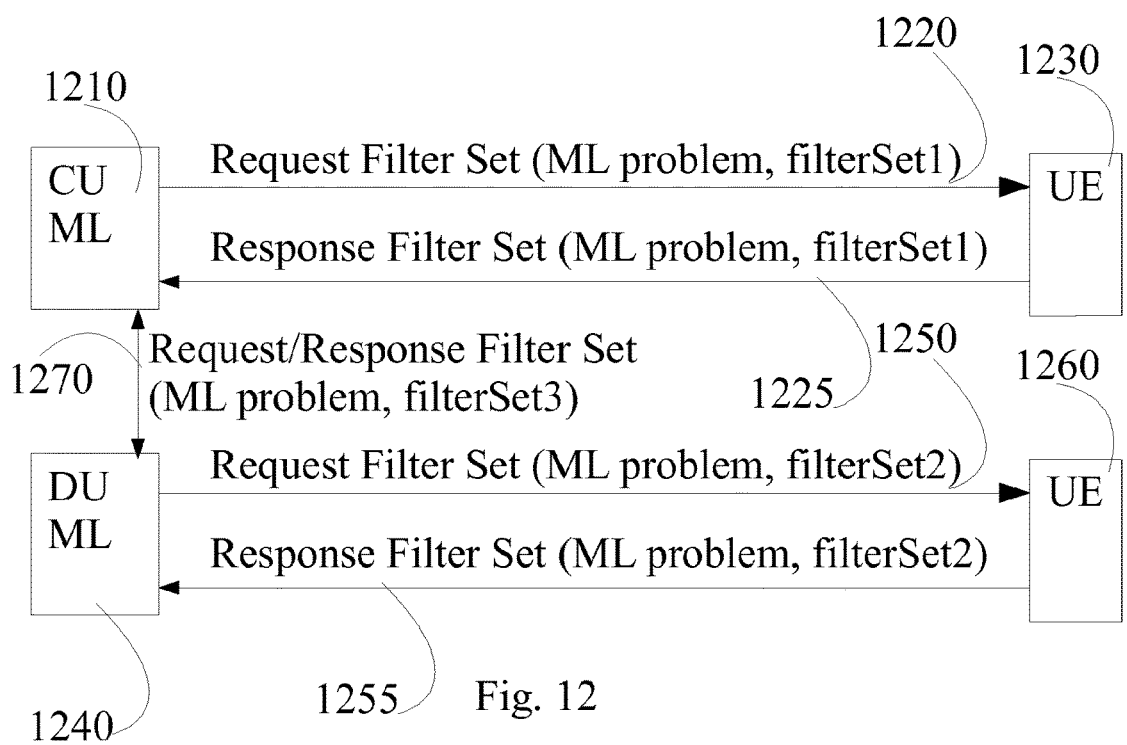
FIG. 12 shows, by way of example, signalling between entities.
Figure 13:
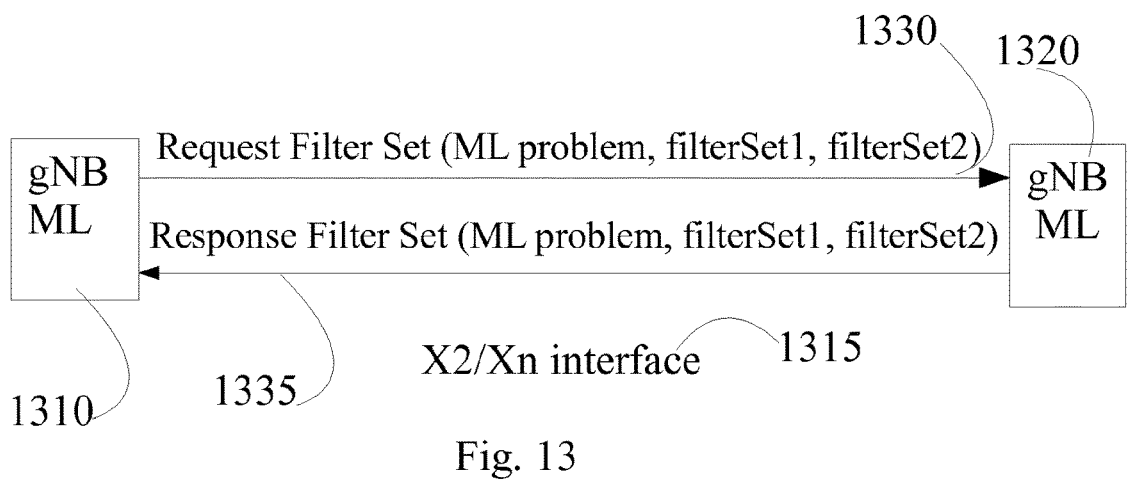
FIG. 13 shows, by way of example, signalling between entities.

ML pipeline may comprise multiple components which may be located in different entities. FIG. 12 shows, by way of example, signalling between entities, wherein the ML is distributed with parts of it placed both at the CU 1210 and the DU 1240. As another example, FIG. 13 shows signalling between entities, wherein the ML algorithm is partly located in one network node, e.g. gNB 1310, and partly in another network node, e.g. gNB 1320.

In FIG. 12, the ML at the CU 1210 may trigger measurement collection from particular UEs by sending 1220 Request Filter Set to one or more UEs 1230 and receiving 1225 a Response Filter Set from the one or more UEs 1230. In this example, no UE indication is included in the Request Filter Set message. The ML may obtain a set of measurements given by filterSet1 from this process.

The ML at the DU 1240 may trigger measurement collection from particular UEs by sending 1250 Request Filter Set to one or more UEs 1260 and receiving 1255 a Response Filter Set from the one or more UEs 1260. In this example, no UE indication is included in the Request Filter Set message. The ML may obtain a set of measurements given by filterSet2 from this process. It is to be noted that the one or more UEs 1230 and one or more UEs 1260 may be the same set of UEs, at least partly, i.e. they may have some overlaps.

The different ML procedures at the CU 1210 and at the DU 1240 may optimize different problems independently and coordinate their optimal decisions. A filterSet3 may need to be communicated 1270 between CU and DU in this case which could correspond to measurements that the ML entity at one, e.g., CU(/DU) needs to request from the other, e.g., DU/CU.

In the example of FIG. 12, it may be assumed that the UEs are already configured to collect the measurements for a given ML problem and filter set.

In FIG. 13, the ML is placed at two different gNBs, e.g. a first network node 1310 and a second network node 1320. It is to be noted, however, that the ML may be placed at more than two different network nodes. In this kind of distributed computing the filter sets need to be communicated across the X2 interface or Xn interface or through some newly defined interface that could interconnect ML entities between eNBs or gNBs respectively 1315. Request Filter Set message may be transmitted 1330 from the first network node 1310 to the second network node 1320, and Response Filter Set message may be transmitted 1335 from the second network node 1320 to the first network node 1310.

Figure 14:
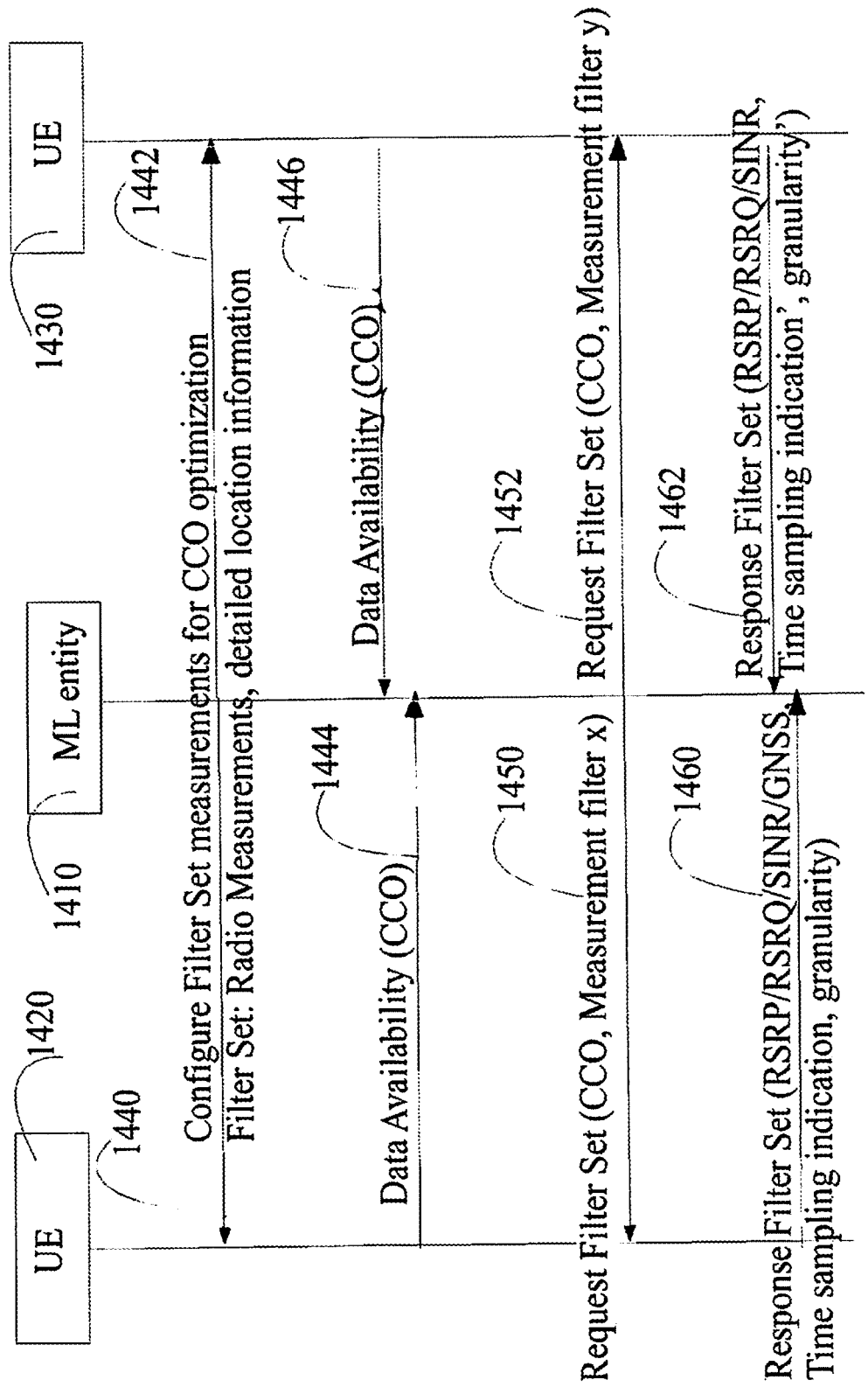
FIG. 14 shows, by way of example, signalling in coverage and capacity optimization (CCO)

FIG. 14 shows, by way of example, signalling in coverage and capacity optimization (CCO). The ML entity 1410 may configure 1440, 1442 a set of UEs, e.g. a first UE 1420 and a second UE 1430 with measurements for CCO optimization. The first UE may be the first data producer. The second UE may be the second data producer. CCO optimization is the given ML optimization problem in this example. The measurements with which the UEs are configured may be related to radio measurements and/or detailed location information. After the configuration, the ML may receive 1444, 1446 indications of data availability for the CCO. The ML entity 1410 may request 1450, 1452 different subsets of the available measurements from different UEs. Hence, for a given ML optimization problem, different Filter Sets may be requested from different UEs. Different Filter Sets are shown in FIG. 14 as Measurement Filter x and Measurement Filter y. Measurement Filter x is comprised in the Request Filter Set sent to the first UE 1420. Measurement Filter x may comprise e.g. serving cell signal and global positioning system (GPS) information. Measurement Filter y is comprised in the Request Filter Set sent to the second UE 1430. Measurement Filter y may comprise, e.g. neighboring cells signal. The UEs may transmit 1460, 1462 a measurement response, i.e. Response Filter Set to the ML entity. The Response Filter Set from the first UE 1420 comprises e.g. RSRP/RSRQ/SINR/GNSS, time sampling indication and granularity. The Response Filter Set from the second UE 1430 comprises e.g. RSRP/RSRQ/SINR, time sampling indication' and granularity'. In this example, the filter sets are 3-dimensional, i.e. the selection of the UEs has already taken place.

Figure 15:
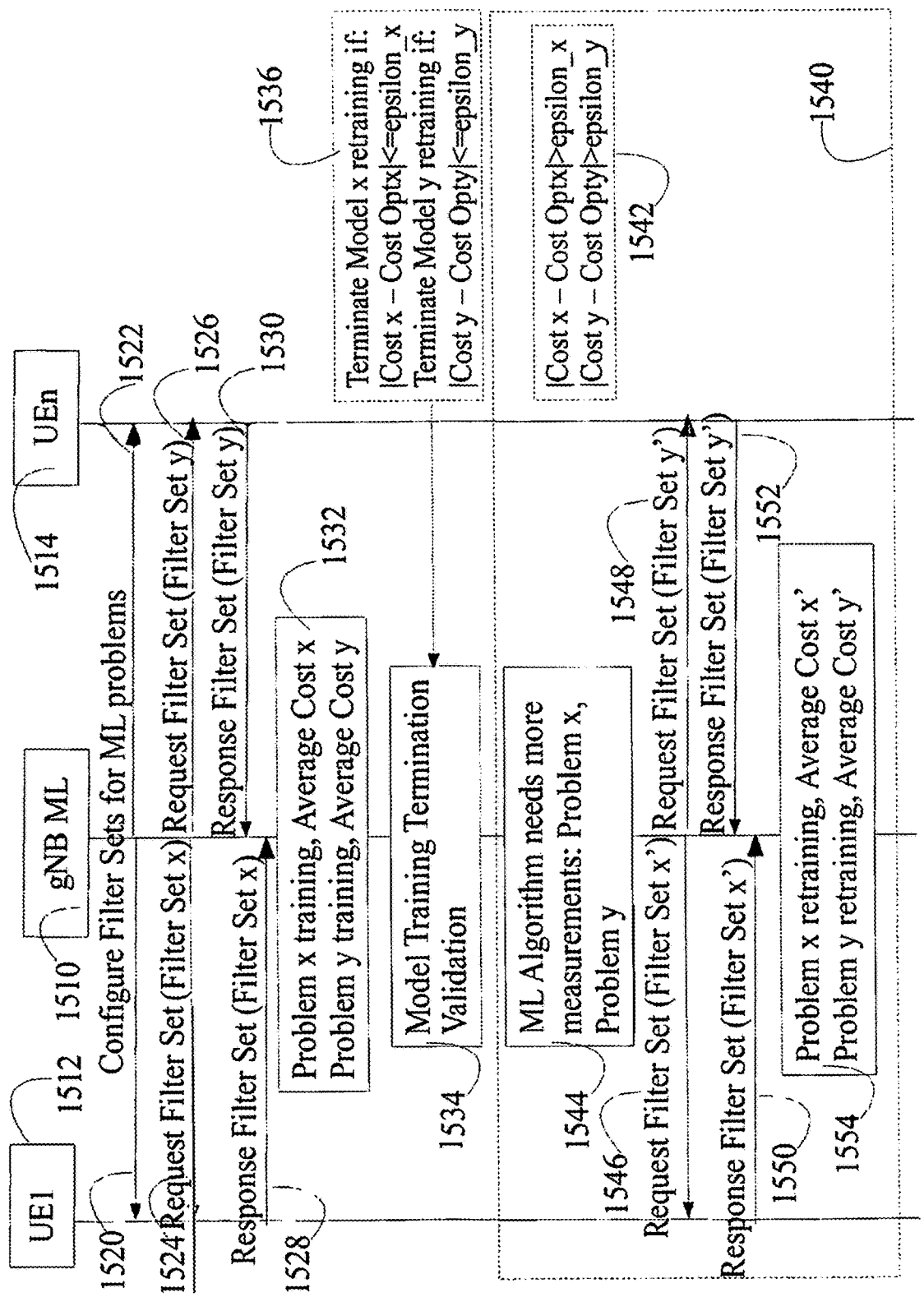
FIG. 15 shows, by way of example, signalling between entities.

FIG. 15 shows, by way of example, signalling between entities, wherein termination conditions for ML algorithm(s) are evaluated. A network node 1510, e.g. a gNB, hosting the ML algorithm may configure 1520, 1522 Filter Sets corresponding to different ML optimization problems at the UEs, e.g. UE1 1512 and UEn 1514. After Filter Set configuration is finished, the gNB may request 1524, 1526 Filter Set measurements for different ML optimization problems. In this example, let as consider two exemplary generic problems x and y. Filter Set x is requested from UE1 1512. Filter Set y is requested from UEn 1514.

Once the gNB receives 1528, 1530 the Filter Sets of different problems from the UEs 1512, 1514 it can use them for training 1532 its ML optimization algorithms. ML algorithms may compute a cost or reward which may determine how well the ML algorithm performs, i.e. does the ML algorithm show required convergence or not. Once this has been computed, a model training termination validation procedure 1534 may be performed which determines whether the ML algorithm has reached the desired performance. The cost or reward that is calculated may be compared 1536 to pre-determined optimal cost or reward, denoted as Cost Optx and Cost Opty in FIG. 15, FIG. 16 and FIG. 17. The algorithm for each ML optimization problem may terminate if the two costs or rewards are close enough. The costs or rewards may be e.g. compared against a ML problem-dependent threshold, denoted as epsilon_x and epsilon_y in FIG. 15, FIG. 16 and FIG. 17. This helps the gNB hosting the ML to save resources, such as energy, memory, etc. If the cost or reward is farther from the optimal cost or reward, more measurements may be requested, and the ML optimization problems may be retrained. The cost or reward procedure is just an example to explain the need for requesting more information or switch off measurements report.

FIG. 15 shows one scenario 1540 of evaluation of termination conditions for ML algorithm. Based on comparison 1542 to pre-determined optimal cost or reward and against a ML problem-dependent threshold, it is detected 1544 that both ML optimization problem x and ML optimization problem y need more measurements. The gNB may request 1546, 1548 more measurements from the UEs for both ML optimization problems. ML may request different filters, e.g. Filter Set x' and Filter Set y', from different UEs corresponding to different subsets of the measurements, different granularities and different time sampling indications.

The filter sets requested for each ML optimization problem may depend on the performance of the ML algorithm and whether it needs an increase or decrease in the measurements. For instance, it may request data from higher or lower number of UEs, and/or data to be sampled with a higher or smaller periodicity, and/or larger or smaller granularity, etc. If the performance is below a pre-determined threshold, the further measurement request is indicative of more requested measurements than in the first measurement request, and/or time sampling indication that indicates higher frequency of measurement sampling than in the first measurement request, and/or higher granularity than in the first measurement request. If the performance is above a pre-determined threshold the further measurement request is indicative of less requested measurements than in the first measurement request, and/or indicative of requesting data from lower number of UEs than in the first measurement request, and/or time sampling indication that indicates lower frequency of measurement sampling than in the first measurement request, and/or lower granularity than in the first measurement request.

After receiving 1550, 1552 the new filter sets, the gNB 1510 can use them for retraining 1554 its ML optimization algorithms. ML algorithms may compute a cost or reward which may determine how well the ML algorithm performs.

Figure 16:
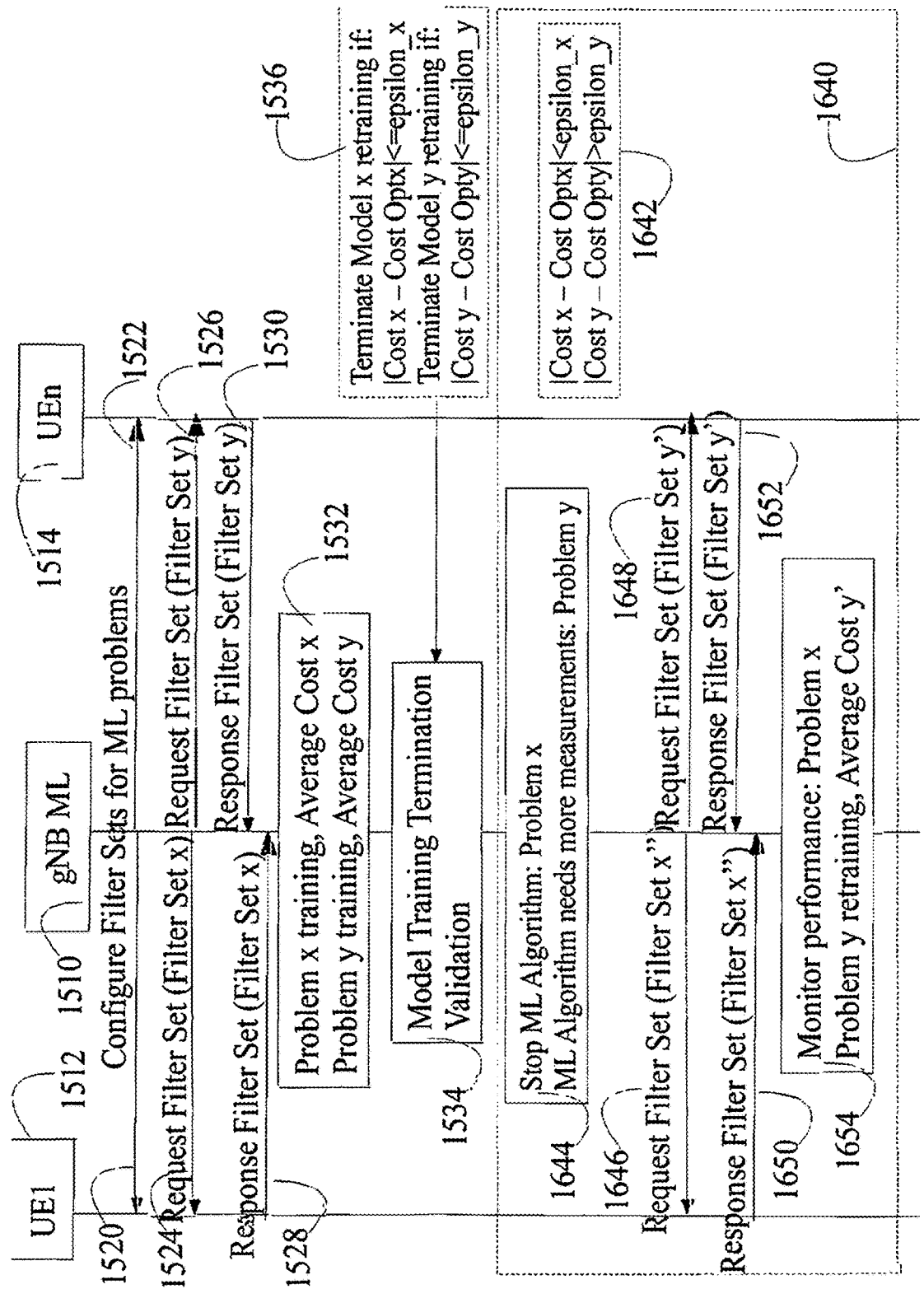
FIG. 16 shows, by way of example, signalling between entities.

FIG. 16 shows another scenario 1640 of evaluation of termination conditions for ML algorithm, wherein the algorithm for problem x may be terminated while algorithms for problem y needs to obtain more measurements. Based on comparison 1642 to pre-determined optimal cost or reward and against a ML problem-dependent threshold, it is detected 1644 that ML optimization problem x meets the termination condition and no more measurements are needed for this problem. ML optimization algorithm for problem x may be stopped. Still, measurements, e.g. light measurements, e.g. Filter Set x", may be requested 1646 by the ML in the gNB in order to monitor network performance. Based on comparison 1642, it is detected 1644 that ML optimization problem y needs more measurements. To meet the performance the gNB may request 1648 more measurements, e.g. Filter Set y', e.g. from higher number of UEs, and/or of higher granularity and/or more frequent time sampling indications. After receiving 1650, 1652 the new filter sets, the gNB 1510 may monitor 1654 performance based on the received measurements relating to problem x, and retrain 1654 its ML optimization algorithms relating to problem y.

Figure 17:
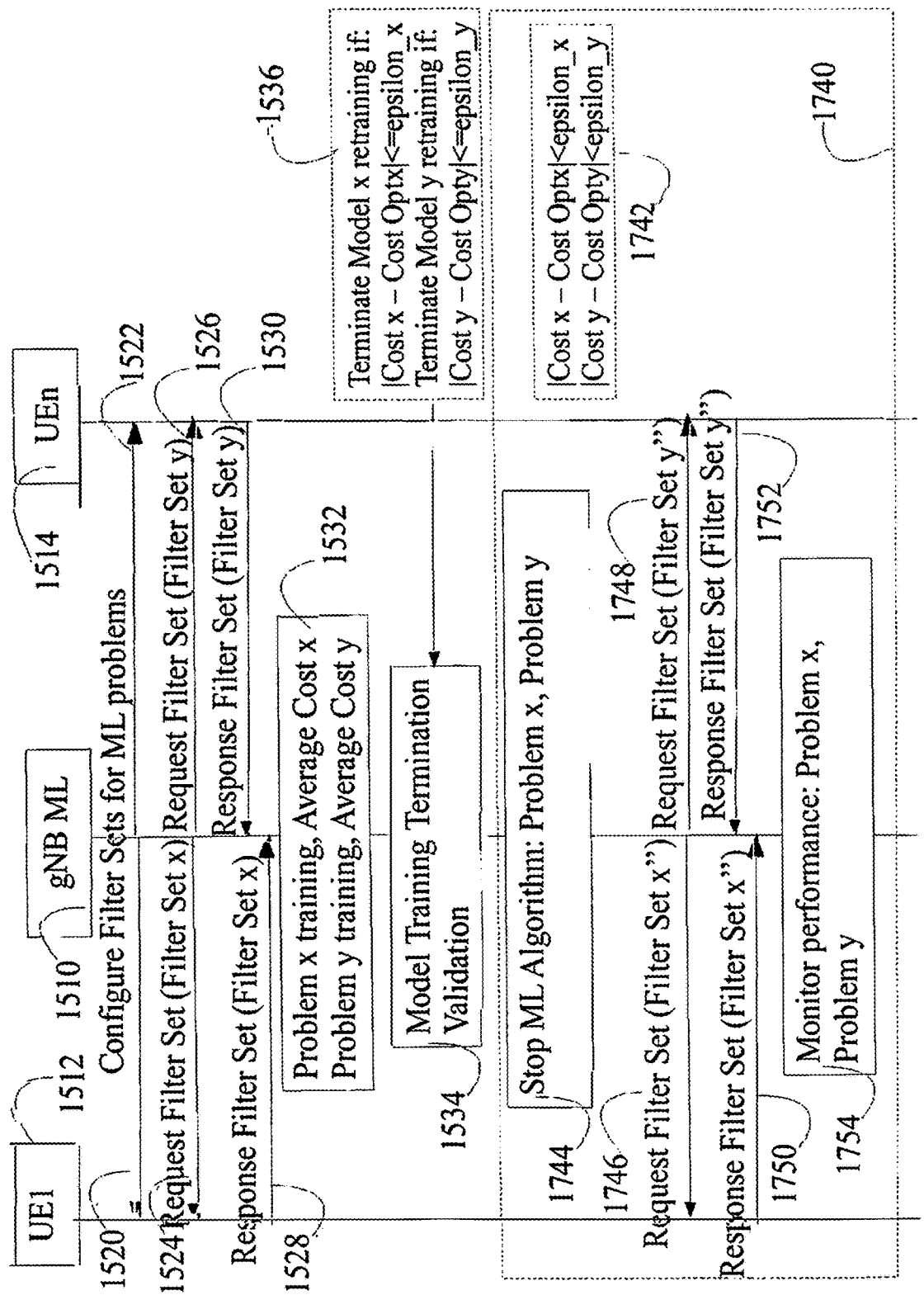
FIG. 17 shows, by way of example, signalling between entities.

FIG. 17 shows still another scenario 1740 of evaluation of termination conditions for ML algorithm, wherein the algorithms for problems x and y may be stopped. Based on comparison 1742 to pre-determined optimal cost or reward and against a ML problem-dependent threshold, it is detected 1744 that Both ML optimization problem x and ML optimization problem y have satisfactory performance and meet the termination condition. So, the gNB may switch off 1744 both ML optimization algorithms. However, the gNB may still request 1746, 1748 some measurements, e.g. light measurements, e.g. Filter Set x" and Filter Set y", to monitor network performance. After receiving 1750, 1752 the new filter sets, the gNB 1510 may monitor 1754 performance based on the received measurements relating to problem x and problem y.

The methods and signalings as disclosed herein may enable e.g.
- Use of network and RRC radio interface for the purpose of Machine Learning
- Mapping of a set of pre-defined measurements for Immediate and Logged MDT to specific, e.g. well known, ML optimization problems
- Filtering, processing and aggregating the different subsets of the measurements according to:
  - Different periodicities/schedules/sampling periods per measurement
  - Different accuracies/granularities in the requested measurements
  - Different users from which measurements are requested (as a fixed number, set of UE IDs or users satisfying some condition/event)
- Generating a novel configuration of measurements based on filtered measurements subsets, in order to trigger the selective data collection
  - Possibly signal or tag the configuration with ML optimization problem identifying the measurements subsets
- Scoping the amount of measurements depending on the performance received at the ML optimization algorithm:
  - When performance of the ML algorithm for a given problem is poor, more measurements may be requested for a given problem
  - When performance of the ML algorithm for a given problem is satisfactory, ML algorithm may use this information as a trigger to get disabled. Some measurements may still be requested for network performance monitoring
  - Amount and type of measurements may be tuned per ML optimization problem.

The invention claimed is:

1. An apparatus comprising at least one processor, and at least one memory including computer program code, the at least one memory and the computer program code configured to, with the at least one processor, cause the apparatus to perform operations comprising:
    configuring a measurement collection for one or more pre-determined optimization problems at a first data producer;
    transmitting a first measurement request to the first data producer, wherein the first measurement request is indicative of requested measurement(s) for the one or more pre-determined optimization problems, user equipment identity, user equipment measurements, time sampling indication and granularity;
    receiving a measurement response comprising first measurement results corresponding to the first measurement request;
    providing the first measurement results to one or more optimization algorithms for solving the one or more pre-determined optimization problems;
    configuring a measurement collection for one or more pre-determined optimization problems at a second data producer;
    transmitting a second measurement request to the second data producer, wherein the second measurement request is indicative of requested measurement(s) for the one or more pre-determined optimization problems, time sampling indication and granularity;
    receiving a measurement response comprising second measurement results corresponding to the second measurement request; and
    providing the second measurement results to one or more optimization algorithms for solving the one or more pre-determined optimization problems.

2. The apparatus of claim 1, further comprising machine learning algorithm(s) for solving the one or more pre-determined optimization problems using the measurement response.

3. The apparatus of claim 1, the at least one memory and the computer program code configured to, with the at least one processor, cause the apparatus further to perform operations comprising
    receiving an indication on data availability regarding the one or more pre-determined optimization problems from the first data producer.

4. The apparatus of claim 1, wherein the first data producer is a user equipment from which measurements are requested.

5. The apparatus of claim 1, wherein the second measurement request is at least partly different from the first measurement request.

6. The apparatus of claim 1, the at least one memory and the computer program code configured to, with the at least one processor, cause the apparatus further to perform operations comprising;
    determining performance of training the one or more optimization algorithms; and
    transmitting, based on the determined performance of the one or more optimization algorithms, a further measurement request to the first data producer, wherein the further measurement request is at least partly different from the first measurement request.

7. The apparatus of claim 6, wherein the determined performance is below a pre-determined threshold, the further measurement request is indicative of
    more requested measurements than in the first measurement request; and/or
    time sampling indication that indicates higher frequency of measurement sampling than in the first measurement request; and/or
    higher granularity than in the first measurement request.

8. The apparatus of claim 6, wherein the determined performance is above a pre-determined threshold, the further measurement request is indicative of
    less requested measurements than in the first measurement request; and/or
    requesting data from lower number of UEs than in the first measurement request; and/or
    time sampling indication that indicates lower frequency of measurement sampling than in the first measurement request; and/or
    lower granularity than in the first measurement request.

* * * * *